US012050433B2

(12) United States Patent
Anno et al.

(10) Patent No.: US 12,050,433 B2
(45) Date of Patent: Jul. 30, 2024

(54) ELECTROSTATIC CHARGE IMAGE DEVELOPING TONER, ELECTROSTATIC CHARGE IMAGE DEVELOPER, TONER CARTRIDGE, PROCESS CARTRIDGE, AND IMAGE FORMING APPARATUS

(71) Applicant: FUJIFILM Business Innovation Corp., Tokyo (JP)

(72) Inventors: Shintaro Anno, Minamiashigara (JP); Yoshimasa Fujihara, Minamiashigara (JP); Atsushi Sugawara, Minamiashigara (JP); Daisuke Noguchi, Minamiashigara (JP); Satoshi Miura, Minamiashigara (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 437 days.

(21) Appl. No.: 17/409,862

(22) Filed: Aug. 24, 2021

(65) Prior Publication Data

US 2022/0373904 A1 Nov. 24, 2022

(30) Foreign Application Priority Data

May 24, 2021 (JP) ................................ 2021-087062

(51) Int. Cl.
*G03G 9/097* (2006.01)
*G03G 9/08* (2006.01)
*G03G 9/087* (2006.01)

(52) U.S. Cl.
CPC ......... *G03G 9/0819* (2013.01); *G03G 9/0821* (2013.01); *G03G 9/08711* (2013.01); *G03G 9/08755* (2013.01)

(58) Field of Classification Search
CPC ....................... G03G 9/09708; G03G 9/09725
See application file for complete search history.

(56) References Cited

U.S. PATENT DOCUMENTS

2005/0026063 A1 2/2005 Komoto et al.
2015/0309433 A1 10/2015 Sakurada et al.
2017/0090324 A1 3/2017 Kadonome et al.
2018/0074421 A1 3/2018 Uchino et al.
(Continued)

FOREIGN PATENT DOCUMENTS

JP 2005-062807 A 3/2005
JP 2011-133805 A 7/2011
(Continued)

OTHER PUBLICATIONS

Translation of JP 2017-167440.*
(Continued)

*Primary Examiner* — Peter L Vajda
(74) *Attorney, Agent, or Firm* — Oliff PLC

(57) ABSTRACT

An electrostatic charge image developing toner includes: a toner particle containing a binder resin; and an external additive including a silica particle having a circularity of more than 0.5 and 0.9 or less and a volume average particle diameter of more than 100 nm and 300 nm or less, in which a total Net intensity $N_A$ of an alkali metal element and an alkaline earth metal element in the toner particle measured by fluorescence X-ray analysis is 0.10 kcps or more and 1.20 kcps or less.

17 Claims, 2 Drawing Sheets

(56) References Cited

U.S. PATENT DOCUMENTS

| | | | |
|---|---|---|---|
| 2018/0143557 A1 | 5/2018 | Ueda et al. | |
| 2019/0056679 A1 | 2/2019 | Ueda et al. | |

FOREIGN PATENT DOCUMENTS

| | | | | | |
|---|---|---|---|---|---|
| JP | 2014-092381 A | | 5/2014 | | |
| JP | 2015-180156 A | | 10/2015 | | |
| JP | 2015-193031 A | | 11/2015 | | |
| JP | 2015-210410 A | | 11/2015 | | |
| JP | 2017-068006 A | | 4/2017 | | |
| JP | 2017-090489 | * | 4/2017 | ............... | G03G 9/08 |
| JP | 2017-167440 | * | 9/2017 | ............... | G03G 9/08 |
| JP | 2017-167440 A | | 9/2017 | | |
| JP | 2018-045112 A | | 3/2018 | | |
| JP | 2018-66902 | * | 4/2018 | ............... | G03G 9/09 |
| JP | 2020-042122 A | | 3/2020 | | |

OTHER PUBLICATIONS

Translation of JP 2018-66902.*
Translation of JP 2017-090489 (presented as JP 6107917).*
Mar. 9, 2022 Search Report issued in European Patent Application No. 21195693.3.

* cited by examiner

ELECTROSTATIC CHARGE IMAGE DEVELOPING TONER, ELECTROSTATIC CHARGE IMAGE DEVELOPER, TONER CARTRIDGE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2021-087062 filed on May 24, 2021.

BACKGROUND

Technical Field

The present invention relates to an electrostatic charge image developing toner, an electrostatic charge image developer, a toner cartridge, a process cartridge, and an image forming apparatus.

Related Art

JP-A-2005-062807 discloses that "a toner including: toner particles at least including a binder resin, a colorant, a release agent, and a sulfur-containing resin; and an inorganic fine powder mixed with the toner particles, in which i) the toner particles contain at least one element selected from a group consisting of magnesium, calcium, barium, zinc, aluminum, and phosphorus and satisfy the following formula of $4 \leq T/S \leq 30$ (T represents a total content of the corresponding element in ppm, and S represents a content of sulfur element in ppm); ii) a weight-average particle diameter (D4) of the toner is in a range of 3 to 10 μm; and an average circularity of the toner is within a range of 0.950 to 0.995".

JP-A-2015-210410 discloses "an electrostatic charge image developing toner in which an external additive is added to toner base particles containing a binder resin, in which the external additive includes joined body particles formed of secondary particles in which plural spherical primary particles are joined, the joined body particles include at least particles having a secondary particle diameter d2 of a range of 70 nm or more and 400 nm or less, and among the particles having the secondary particle diameter d2 in the range of 70 nm or more and 400 nm or less, 50% by number or more of the particles having a ratio d2/d1 of the secondary particle diameter d2 to a diameter d1 of the primary particles in the joined body particles in a range of 1.6 to 4.2".

JP-A-2018-045112 discloses "an electrostatic charge image developing toner containing toner particles including at least toner base particles and an external additive attached to surfaces of the toner base particles, in which the toner base particles include at least a crystalline polyester resin, the external additive includes silica particles, the silica particles are secondary particles including particles having a primary particle diameter of a range of at least 30 nm to 90 nm, an average circularity of the secondary particles is in a range of 0.25 to 0.50, and an average aspect ratio of the secondary particles is 3.0 or more".

JP-A-2017-068006 discloses "an electrostatic charge image developing toner including toner base particles containing a colorant, and a crystalline resin and an amorphous resin as a binder resin, and an external additive, in which the external additive includes inorganic fine particles having a number average long diameter in at least primary particles in a range of 50 to 100 nm, an average aspect ratio in a range of 3 to 10, and a volume resistivity in a range of $1 \times 10^{10}$ to $1 \times 10^{12}$ Ω·cm".

SUMMARY

Aspects of non-limiting embodiments of the present disclosure relate to an electrostatic charge image developing toner including a toner particle containing a binder resin and an external additive including a silica particle, the electrostatic charge image developing toner being capable of preventing image density unevenness in a case where images having a low image density are continuously formed in a high temperature and high humidity environment and then a secondary color image having a high image density is formed, as compared to a case where a circularity of the silica particle is 0.5 or less or more than 0.9, a case where a volume average particle diameter of the silica particle is 100 nm or less or more than 300 nm, or a case where a total Net intensity $N_A$ of an alkali metal element and an alkaline earth metal element in the toner particle measured by fluorescence X-ray analysis is less than 0.10 kcps or more than 1.20 kcps.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrostatic charge image developing toner includes: a toner particle containing a binder resin; and an external additive including a silica particle having a circularity of more than 0.5 and 0.9 or less and a volume average particle diameter of more than 100 nm and 300 nm or less, in which a total Net intensity $N_A$ of an alkali metal element and an alkaline earth metal element in the toner particle measured by fluorescence X-ray analysis is 0.10 kcps or more and 1.20 kcps or less.

BRIEF DESCRIPTION OF THE DRAWINGS

Exemplary embodiment(s) of the present invention will be described in detail based on the following figures, wherein.

DETAILED DESCRIPTION

Figure 1:
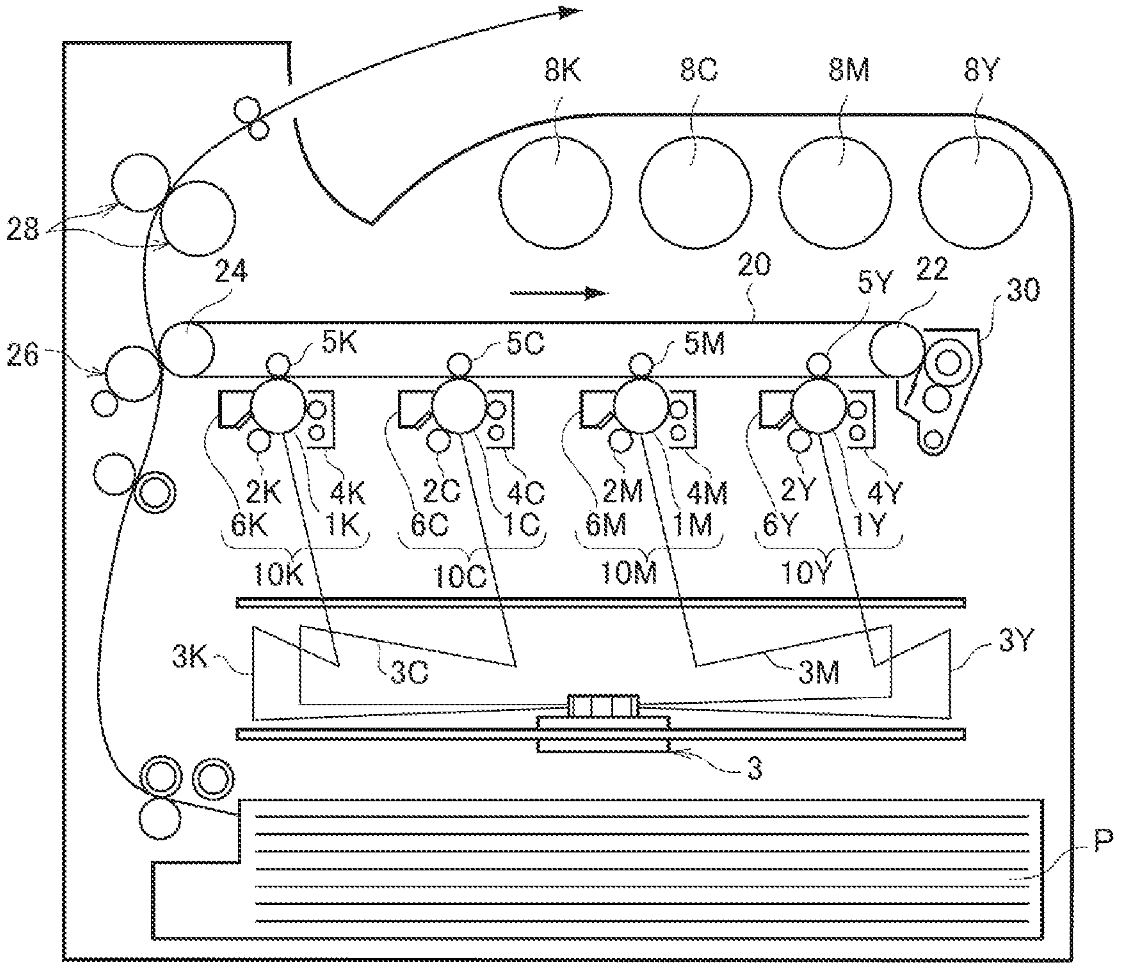
FIG. 1 is a schematic configuration diagram illustrating an example of an image forming apparatus according to the present exemplary embodiment.

Hereinafter, an exemplary embodiment which is an example of the present invention will be described in detail.

In numerical ranges described in stages, an upper limit or a lower limit described in a certain numerical range may be replaced with an upper limit or a lower limit of a numerical range described in other stages.

In the numerical ranges, the upper limit or the lower limit described in the certain numerical range may be replaced with values illustrated in Examples.

Referring to the amount of each component in the composition, when there are plural substances corresponding to each component in the composition, unless otherwise specified, it refers to the total amount of the plural substances present in the composition.

The term “step” indicates not only an independent step, and even when a step cannot be clearly distinguished from other steps, this step is included in the term “step” as long as the intended purpose of the step is achieved.

Each component may contain plural kinds of corresponding substances.

In a case of referring to the amount of each component in the composition, when there are plural kinds of substances corresponding to each component in the composition, unless otherwise specified, it refers to the total amount of the plural kinds of substances present in the composition.

The term “alkali metal element” refers to Li, Na, K, Rb, Cs, and Fr.

The term “alkaline earth metal element” refers to Be, Mg, Ca, Sr, Ba, and Ra.

<Electrostatic Charge Image Developing Toner>

An electrostatic charge image developing toner according to the present exemplary embodiment (hereinafter, “electrostatic charge image developing toner” is also simply referred to as a “toner”) includes a toner particle containing a binder resin and an external additive containing a silica particle having a circularity of more than 0.5 and 0.9 or less and a volume average particle diameter of more than 100 nm and 300 nm or less.

Further, a total Net intensity $N_A$ of an alkali metal element and an alkaline earth metal element in the toner particle measured by fluorescence X-ray analysis is 0.10 kcps or more and 1.20 kcps or less.

With the above-described configuration, the toner according to the present exemplary embodiment may prevent image density unevenness in a case where an image having a low image density (for example, image density 20%) is continuously formed in a high temperature and high humidity environment (for example, in an environment of 28.5° C. and 85% RH) and then a secondary color image having a high image density is formed. A reason thereof is presumed as follows.

When images are continuously formed using the toner having the toner particle and the external additive, the external additive may be easily embedded in the toner particle. Further, the external additive may be likely to roll on the toner particle, and the external additive may be likely to be unevenly distributed. The toner in which the external additive is embedded in the toner particle or the toner in which the external additive is unevenly distributed is likely to cause an increase in an adhesive force. In this case, toners having different adhesive forces are likely to be mixed. Therefore, transfer unevenness of the image is likely to occur, and thus image density unevenness is likely to occur.

Therefore, in order to prevent the image density unevenness, the external additive having a relatively large particle diameter may be used in order to prevent the embedment. However, the external additive having the relatively large particle diameter is likely to be separated from the toner particle, and when the images having the low image density are continuously formed under the high temperature and high humidity environment, an effect of the external additive is not sufficiently exhibited, and for example, the toner particles may aggregate. Therefore, when the images having the low image density are continuously formed in the high temperature and high humidity environment and then the image is formed, the image density unevenness may be likely to occur. Then, the image density unevenness may become remarkable when the secondary color image having a high image density is formed. A reason why the image density unevenness becomes remarkable when the secondary color image having a high image density is formed is that two types of toners forming the secondary color image having a high image density are likely to have factors causing the image density unevenness, for example, including an aggregate of the toner particles, and these factors overlap when the secondary color image having a high image density is formed.

The toner according to the present exemplary embodiment includes the external additive including a silica particle having a circularity of more than 0.5 and 0.9 or less and a volume average particle diameter of more than 100 nm and 300 nm or less. The silica particle satisfying this requirement tends to have a relatively large particle diameter and have irregular shapes. Since a contact area between the silica particle and a toner particle surface is likely to be small due to the small circularity, the silica particle may be prevented from being embedded in the toner particle surface. Further, since the external additive has the irregular shapes, the external additive may be less likely to roll on the toner particle.

Further, in the toner according to the present exemplary embodiment, the total of the Net intensity $N_A$ of the alkali metal element and the alkaline earth metal element in the toner particle measured by the fluorescence X-ray analysis is 0.10 kcps or more and 1.20 kcps or less. When the Net intensity $N_A$ in the toner is within the above range, adsorbed moisture may be likely to be adhered to the alkali metal element and the alkaline earth metal element present on a toner particle surface side. That is, since the toner particle surface contains a large amount of the adsorbed moisture, the external additive may be more likely to adhere to the toner particle surface. Therefore, even after the images having the low image density are continuously formed in the high temperature and high humidity environment, the external additive may be less likely to move from the toner particle surface, Therefore, the toner particle surface may be easily maintained in a state of being coated with the external additive, and the aggregation of the toner particles may be less likely to occur.

As described above, in the resin particles according to the present exemplary embodiment, even when the images having the low image density are continuously formed in the high temperature and high humidity environment, the silica particles having the relatively large particle diameter may be likely to remain on the toner particle surface. Therefore, even when the image is formed thereafter, the image density unevenness may be less likely to occur. Therefore, even in a case where the secondary color image having a high image density is formed, the two types of toilers forming the secondary color image having a high image density hardly have a factor causing the image density unevenness, and the image density unevenness in a case where the secondary color image having a high image density is formed may be prevented.

Therefore, it is presumed that the toner according to the present exemplary embodiment may prevent the image density unevenness in a case where the images having the low image density are continuously formed under the high temperature and high humidity environment and then the secondary color image having a high image density is formed.

(Toner Particle)

The toner particle contains the binder resin. The toner particle may contain a colorant, a release agent, an alkali metal element supply source, an alkaline earth metal element supply source, a Cl element supply source, and other additives.

—Binder Resin—

Examples of the binder resin include vinyl resins composed of homopolymers of monomers such as styrenes (such as styrene, parachlorostyrene, and α-methylstyrene), (meth) acrylates (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene), or copolymers obtained by combining two or more of these monomers.

Examples of the binder resin include a non-vinyl resin such as an epoxy resin, a polyester resin, a polyurethane resin, a polyamide resin, a cellulose resin, a polyether resin, and a modified resin, a mixture of the non-vinyl resin and the vinyl resin, and a graft polymer obtained by polymerizing a vinyl monomer in the presence of the non-vinyl resins and the vinyl resin.

These binder resins may be used alone or in combination of two or more thereof.

Examples of the binder resin include an amorphous resin and a crystalline resin.

The "crystalline" of a resin refers to having a clear endothermic peak in differential scanning calorimetry (DSC), not a stepwise change in endothermic amount, and specifically refers to that the half-value width of the endothermic peak when measured at a temperature rising rate of 10 (° C./min) is within 15° C.

On the other hand, the "amorphous" of a resin refers to that the half-value width is larger than 15° C. that the endothermic amount changes stepwise, or that no clear endothermic peak is observed.

The amorphous resin will be described.

Examples of the amorphous resin include known amorphous resins such as an amorphous polyester resin, an amorphous vinyl resin (such as a styrene acrylic resin), an epoxy resin, a polycarbonate resin, and a polyurethane resin. From a viewpoint that dispersibility of the alkali metal element and the alkaline earth metal element in the toner particles is improved and the corresponding metal elements are more likely to be present on a toner surface side, among the above amorphous resins, the amorphous polyester resin and the amorphous vinyl resin (particularly, a styrene acrylic resin) are preferred, and the amorphous polyester resin is more preferred.

It is also preferable to use an amorphous polyester resin and a styrene acrylic resin in combination as the amorphous resin.

Examples of the amorphous polyester resin include a polycondensate of a polycarboxylic acid and a polyhydric alcohol. As the amorphous polyester resin, a commercially available product or a synthesized product may be used.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenylsuccinic acid, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), and an anhydride or a lower alkyl ester (e.g., having 1 or more and 5 or less carbon atoms) thereof. Among these, the polycarboxylic acid is preferably, for example, an aromatic dicarboxylic acid.

As the polycarboxylic acid, a tricarboxylic or higher carboxylic acid having a cross-linked structure or a branched structure may be used in combination with a dicarboxylic acid. Examples of the tricarboxylic or higher carboxylic acid include trimellitic acid, pyromellitic acid, and an anhydride or a lower alkyl ester (such as having 1 or more and 5 or less carbon atoms) thereof.

The polycarboxylic acid may be used alone or in combination of two or more thereof.

Examples of the polyhydric alcohol include aliphatic diols (such as ethylene glycol, diethylene glycol, triethylene glycol, propylene glycol, hutanediol, hexanediol, and neopentyl glycol), alicyclic diols (such as cyclohexanediol, cyclohexanedimethanol, and hydrogenated bisphenol A), and aromatic diols (such as a bisphenol A ethylene oxide adduct and a bisphenol A propylene oxide adduct). Among these, the polyhydric alcohol is preferably, for example, an aromatic diol and an alicyclic diol, and more preferably an aromatic diol.

As the polyhydric alcohol, a trihydric or higher polyhydric alcohol having a cross-linked structure or a branched structure may be used in combination with a diol. Examples of the trihydric or higher polyhydric alcohol include glycerin, trimethylolpropane, and pentaerythritol.

The polyhydric alcohol may be used alone or in combination of two or more thereof.

The amorphous polyester resin is obtained by a well-known production method. Specifically, for example, the amorphous polyester resin may be obtained by a method in which the polymerization temperature is set to 180° C. or higher and 230° C. or lower, the pressure in the reaction system is reduced as necessary, and the reaction is performed while removing water and alcohol generated during the condensation.

When raw material monomers are insoluble or incompatible at the reaction temperature, a high boiling point solvent may be added as a dissolution assisting agent for dissolution. In this case, a polycondensation reaction is carried out while distilling off the dissolution assisting agent. When there is a poorly compatible monomer, it is preferable that the poorly compatible monomer is firstly condensed with an acid or alcohol to be polycondensed with the poorly compatible monomer and then the obtained product is polycondensed with the main component.

Here, examples of the amorphous polyester resin include a modified amorphous polyester resin in addition to the unmodified amorphous polyester resin described above. The modified amorphous polyester resin is an amorphous polyester resin in which a bonding group other than an ester bond is present, or an amorphous polyester resin in which a resin component different from the amorphous polyester resin component is bonded by a covalent bond, an ionic bond, or the like. Examples of the modified amorphous polyester resin include a resin in which an amorphous polyester resin having a functional group such as an isocyanate group that reacts with an acid group or a hydroxyl group at a terminal thereof is reacted with an active hydrogen compound to modify the terminal.

The styrene acrylic resin is a copolymer obtained by copolymerizing at least a styrene-based monomer (a monomer having a styrene skeleton) and a (meth) acryl-based monomer (a monomer having a (meth) acrylic group, preferably a monomer having a (meth) acryloxy group). The styrene acrylic resin includes, for example, a copolymer of a styrene monomer and a (meth) acrylic acid ester monomer.

An acrylic resin portion in the styrene acrylic resin has a partial structure formed by polymerizing one or both of the acryl-based monomer and a methacrylic-based monomer. "(meth) acryl" is an expression including both "acryl" and "methacryl".

Specific examples of the styrene-based monomer include styrene, alkyl-substituted styrenes (such as α-methylstyrene, 2-methylstyrene, 3-methylstyrene, 4-methylstyrene, 2-ethylstyrene, 3-ethylstyrene, and 4-ethylstyrene), halogen-substituted styrenes (such as 2-chlorostyrene, 3-chlorostyrene, and 4-chlorostyrene), and vinylnaphthalene. The styrene-based monomer may be used alone or in combination of two or more thereof.

Among these, the styrene-based monomer is preferably a styrene in terms of ease of reaction, ease of reaction control, and availability.

Specific examples of the (meth) acryl-based monomer include (meth) acrylic acid and (meth) acrylic ester. Examples of the (meth) acrylic ester include alkyl (meth) acrylate ester (such as methyl (meth) acrylate, ethyl (meth) acrylate, n-propyl (meth) acrylate, n-butyl (meth) acrylate, n-pentyl (meth) acrylate, n-hexyl (meth) acrylate, n-heptyl (meth) acrylate, n-octyl (meth) acrylate, n-decyl (meth) acrylate, n-dodecyl (meth) acrylate, n-lauryl (meth) acrylate, n-tetradecyl (meth) acrylate, n-hexadecyl (meth) acrylate, n-octadecyl (meth) acrylate, isopropyl (meth) acrylate, isobutyl (meth) acrylate, t-butyl (meth) acrylate, isopentyl (meth) acrylate, amyl (meth) acrylate, neopentyl (meth) acrylate, isohexyl (meth) acrylate, isoheptyl (meth) acrylate, isooctyl (meth) acrylate, 2-ethylhexyl (meth) acrylate, cyclohexyl (meth) acrylate, and t-butylcyclohexyl (meth) acrylate), aryl (meth) acrylate ester (such as phenyl (meth) acrylate, biphenyl (meth) acrylate, diphenylethyl (meth) acrylate, t-butylphenyl (meth) acrylate, and terphenyl (meth) acrylate), dimethylaminoethyl (meth) acrylate, diethylaminoethyl (meth) acrylate, methoxyethyl (meth) acrylate, 2-hydroxyethyl (meth) acrylate, β-carboxyethyl (meth) acrylate, and (meth) acrylamide. The (meth) acrylate-based monomers may be used alone or in combination of two or more thereof.

Among these (meth) acryl-based monomers, and among these (meth) acrylic esters, (meth) acrylate esters having an alkyl group having 2 to 14 carbon atoms (preferably 2 to 10 carbon atoms, and more preferably 3 to 8 carbon atoms) are preferable from a viewpoint of fixing property.

Among these, n-butyl (meth) acrylate is preferable, and n-butyl acrylate is particularly preferable.

A copolymerization ratio of the styrene-based monomer to the (meth) acryl-based monomer (based on mass, styrene-based monomer/(meth) acryl-based monomer) is not particularly limited, but is preferably 85/15 to 70/30.

The styrene acrylic resin may have a cross-linked structure. As the styrene acrylic resin having a cross-linked structure, for example, a styrene acrylic resin obtained by polymerizing at least a styrene-based monomer, a (meth) acrylate-based monomer, and a cross-linked monomer is preferably used.

Examples of the cross-linked monomer include two or more functional crosslinking agents.

Examples of the bifunction crosslinking agent include divinylbenzene, divinylnaphthalene, di (meth) acrylate compounds (such as diethylene glycol di (meth) acrylate, methylenebis (meth) acrylamide, decanediol diacrylate, and glycidyl (meth) acrylate), polyester di (meth) acrylate, and 2-([1'-methylpropylideneamino]carboxyamino) ethyl methacrylate.

Examples of the polyfunctional crosslinking agent include tri (meth) acrylate compounds (such as pentaerythritol tri (meth) acrylate, trimethylol ethane tri (meth) acrylate, and trimethylolpropane tri (meth) acrylate), tetra (meth) acrylate compounds (such as pentaerythritol tetra (meth) acrylate and oligoester (meth) acrylate), 2,2-bis (4-methacryloxy, polyethoxy phenyl) propane, diallyl phthalate, triallyl cyanurate, triallyl isocyanurate, triallyl trimellitate, and diaryl chlorendate.

From the viewpoint of preventing occurrence of image density decrease and, occurrence of the image density unevenness, and from the viewpoint of the fixing property, among these, as the cross-linked monomer, a bifunction (meth) acrylate compound is preferable, a bifunction (meth) acrylate compound is more preferable, a bifunction (meth) acrylate compound having an alkylene group having 6 to 20 carbon atoms is still more preferable, and a bifunction (meth) acrylate compound having a linear alkylene group having 6 to 20 carbon atoms is particularly preferable.

A copolymerization ratio (based on mass, crosslinkable monomer/total monomer) of the cross-linked monomer to the total monomers is not particularly limited, but is preferably from 2/1,000 to 20/1,000.

A method for producing the styrene acrylic resin is not particularly limited, and various polymerization methods (such as solution polymerization, precipitation polymerization, suspension polymerization, bulk polymerization, emulsion polymerization, and the like) are applied. As a polymerization reaction, a known operation (such as a batch type, a semi-continuous type, a continuous type, or the like) is applied.

Amorphous Resin (hereinafter, also Referred to as "Hybrid Amorphous Resin") Having Amorphous Polyester Resin Segment and Styrene Acrylic Resin Segment The hybrid amorphous resin is an amorphous resin in which the amorphous polyester resin segment and the styrene acrylic resin segment are chemically bonded.

Examples of the hybrid amorphous resin include a resin having a main chain made of a polyester resin and a side chain made of a styrene acrylic resin chemically bonded to the main chain; a resin having a main chain made of a styrene acrylic resin and a side chain made of a polyester resin chemically bonded to the main chain; a resin having a main chain formed by chemical bonding of a polyester resin and a styrene acrylic resin; and a resin having a main chain formed by chemical bonding of a polyester resin and a styrene acrylic resin, and at least one side chain of a side chain made of a polyester resin chemically bonded to the main chain and a side chain made of a styrene acrylic resin chemically bonded to the main chain.

The amorphous polyester resin and the styrene acrylic resin of each segment are as described above, and the description thereof is omitted.

A total amount of the polyester resin segment and the styrene acrylic resin segment in the entire hybrid amorphous resin is preferably 80% by mass or more, more preferably 90% by mass or more, still more preferably 95% by mass or more, and still more preferably 100% by mass.

In the hybrid amorphous resin, a proportion of the styrene acrylic resin segment in the total amount of the polyester resin segment and the styrene acrylic resin segment is preferably 20% by mass or more and 60% by mass or less, more preferably 25% by mass or more and 55% by mass or less, and still more preferably 30% by mass or more and 50% by mass or less.

The hybrid amorphous resin can be produced by any of the following methods (i) to (iii). (i) After producing the polyester resin segment by condensation polymerization of the polyhydric alcohol and the polycarboxylic acid, the monomer constituting the styrene acrylic resin segment is subjected to addition polymerization. (ii) After the styrene acrylic resin segment is produced by addition polymerization of an addition polymerizable monomer, the polyhydric alcohol and the polycarboxylic acid are subjected to the condensation polymerization. (iii) The condensation polymerization of the polyhydric alcohol and the polycarboxylic acid and the addition polymerization of the addition polymerizable monomer are performed in parallel.

A proportion of the hybrid amorphous resin to the total binder resin is preferably 60% by mass or more and 98% by mass or less, more preferably 65% by mass or more and 95% by mass or less, and still more preferably 70% by mass or more and 90% by mass or less.

A glass transition temperature (Tg) of the amorphous resin is preferably 50° C. or higher and 80° C. or lower, and more preferably 50° C. or higher and 65° C. or lower.

The glass transition temperature is obtained from a DSC curve obtained by differential scanning calorimetry (DSC), and is more specifically obtained by the "extrapolated glass transition onset temperature" of a method for obtaining the glass transition temperature described in JIS K 7121-1987 "Method for measuring transition temperature of plastics".

A weight average molecular weight (Mw) of the amorphous resin is preferably 5,000 or more and 1,000,000 or less, and more preferably 7,000 or more and 500,000 or less.

A number average molecular weight (Mn) of the amorphous resin is preferably 2.000 or more and 100,000 or less.

A molecular weight distribution Mw/Mn of the amorphous resin is preferably 1.5 or more and 100 or less, and more preferably 2 or more and 60 or less.

The weight average molecular weight and the number average molecular weight are measured by gel permeation chromatography (GPC). The molecular weight is measured by GPC by using a GPC HLC-8120GPC manufactured by Tosoh Corporation as a measurement device, a column TSKgel Super HM-M (15 cm) manufactured by Tosoh Corporation, and a THF solvent. The weight average molecular weight and the number average molecular weight are calculated based on the measurement result by using a molecular weight calibration curve prepared using a monodispersed polystyrene standard sample.

The crystalline resin will be described.

Examples of the crystalline resin include known crystalline resins such as crystalline polyester resins and crystalline vinyl resins (such as polyalkylene resins and long-chain alkyl (meth) acrylate resins). From the viewpoint that the dispersibility of the alkali metal element and the alkaline earth metal element in the toner particles is improved and the corresponding metal elements are more likely to be present on the toner surface side, among the above crystalline resins, the crystalline polyester resin is preferred.

Examples of the crystalline polyester resin include a polycondensate of a polycarboxylic acid and a polyhydric alcohol. As the crystalline polyester resin, a commercially available product or a synthesized product may be used.

Here, in order to easily form a crystal structure, the crystalline polyester resin is preferably a polycondensate using a polymerizable monomer having a linear aliphatic group rather than a polymerizable monomer having aromatic series.

Examples of the polycarboxylic acid include aliphatic dicarboxylic acids (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (such as dibasic acids such as phthalic acid, isophthalic acid, terephthalic acid, and naphthalene-2,6-dicarboxylic acid), and an anhydride or a lower alkyl ester (such as having 1 or more and 5 or less carbon atoms) thereof.

As the polycarboxylic acid, a tricarboxylic or higher carboxylic acid having a cross-linked structure or a branched structure may be used in combination with a dicarboxylic acid. Examples of the tricarboxylic acid include aromatic carboxylic acids (such as 1,2,3-benzenetricarboxylic acid, 1,2,4-benzenetricarboxylic acid, and 1,2,4-naphthalenetricarboxylic acid), and an anhydride or a lower alkyl ester (such as having 1 or more and 5 or less carbon atoms) thereof.

As the polycarboxylic acid, a dicarboxylic acid having a sulfonic acid group or a dicarboxylic acid having an ethylenic double bond may be used in combination with these dicarboxylic acids.

The polycarboxylic acid may be used alone or in combination of two or more thereof.

Examples of the polyhydric alcohol include aliphatic diols (such as a linear aliphatic diol having 7 or more and 20 or less carbon atoms in the main chain portion). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonaniediol, 1,10-decanediol, 1,11-undecanediol, 1,12-dodecanediol, 1,13-tridecanediol, 1,14-tetradecanediol, 1,18-octadecanediol, and 1,20-eicosanediol. Among these, the aliphatic diol is preferably 1,8-octanediol, 1,9-nonanediol, and 1,10-decanediol.

As the polyhydric alcohol, a trihydric or higher alcohol having a cross-linked structure or a branched structure may be used in combination with a diol. Examples of the trihydric or higher polyhydric alcohol include glycerin, trimethylolethane, trimethylolpropane, and pentaerythritol.

The polyhydric alcohol may be used alone or in combination of two or more thereof.

Here, the polyhydric alcohol preferably has an aliphatic diol content of 80 mol % or more, and preferably 90 mol % or more.

The crystalline polyester resin can be obtained by, for example, a known production method same as the amorphous polyester resin.

A melting temperature of the crystalline resin is preferably 50° C. or higher and 100° C. or lower, more preferably 55° C. or higher and 90° C. or lower, and still more preferably 60° C. or higher and 85° C. or lower.

The melting temperature is obtained from the DSC curve obtained by differential scanning calorimetry (DSC) according to the "melting peak temperature" of a method for obtaining the melting temperature described in JIS K 7121-1987 "Method for measuring transition temperature of plastics".

A weight average molecular weight (Mw) of the crystalline resin is preferably 6,000 or more and 35,000 or less.

From a viewpoint that by interaction between a carboxyl group derived from the crystalline polyester resin and the alkali metal element and the alkaline earth metal element in the toner particles, the dispersibility of the corresponding metal element is further improved, so that the corresponding metal elements are more likely to be present on the toner surface side, the crystalline polyester resin is preferably a polymer of an α, ω-linear aliphatic dicarboxylic acid and an α, ω-linear aliphatic diol.

The α, ω-linear aliphatic dicarboxylic acid is preferably an α, ω-linear aliphatic dicarboxylic acid in which an alkylene group connecting two carboxyl groups has 3 to 14 carbon atoms, more preferably 4 to 12 carbon atoms, and still more preferably 6 to 10 carbon atoms.

Examples of the α, ω-linear aliphatic dicarboxylic acid include succinic acid, glutaric acid, adipic acid, 1,6-hexane dicarboxylic acid (commonly used name suberic acid), 1,7-heptane dicarboxylic acid (commonly used name azelaic acid), 1,8-octane dicarboxylic acid (commonly used name sebacic acid), 1,9-nonane dicarboxylic acid, 1,10-decane dicarboxylic acid, 1,12-dodecane dicarboxylic acid, 1,14-tetradecane dicarboxylic acid, and 1,18-octadecane dicarboxylic acid. Among these, 1,6-hexane dicarboxylic acid, 1,7-heptane dicarboxylic acid, 1,8-octane dicarboxylic acid, 1,9-nonane dicarboxylic acid, and 1,10-decane dicarboxylic acid are preferable.

The α, ω-linear aliphatic dicarboxylic acid may be used alone or in combination of two or more thereof.

The α, ω-linear aliphatic diol is preferably an α, ω-linear aliphatic diol in which an alkylene group connecting two hydroxy groups has 3 to 14 carbon atoms, more preferably 4 to 12 carbon atoms, and still more preferably 6 to 10 carbon atoms.

Examples of the α, ω-linear aliphatic dial include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,14-tetradecanediol, and 1,18-octadecanediol. Among these, 1,6-hexanediol, 1,7-heptanediol, 1,8-octanediol, 1,9-nonanediol, and 1,10-decanediol are preferable.

The α, ω-linear aliphatic diol may be used alone or in combination of two or more thereof.

From the viewpoint that the dispersibility of the alkali metal element and the alkaline earth metal element in the toner particles is improved and the corresponding metal elements are more likely to be present on the toner surface side, the polymer of an α, ω-linear aliphatic dicarboxylic acid and an α, ω-linear aliphatic diol is preferably a polymer of at least one selected from a group consisting of 1,6-hexane dicarboxylic acid, 1,7-heptane dicarboxylic acid, 1,8-octane dicarboxylic acid, 1,9-nonane dicarboxylic acid, and 1,10-decane dicarboxylic acid and at least one selected from a group consisting of 1,6-hexanediol, 1,7-heptanediol, 1,8-octanediol, 1,9-nonanediol, and 1,10-decanediol. Among these, the polymer of an α, ω-linear aliphatic dicarboxylic acid and an α, ω-linear aliphatic diol is more preferably a polymer of 1,10-decane dicarboxylic acid and 1,6-hexanediol.

From a viewpoint that by interaction between the alkali metal element and the alkaline earth metal element in the toner particles, the dispersibility of the corresponding metal element is further improved, so that the corresponding metal elements are more likely to be present on the toner surface side, the binder resin preferably contains an amorphous polyester resin and a crystalline polyester resin.

—Colorant—

Examples of the colorant include various pigments such as Carbon Black, Chrome Yellow, Hansa Yellow, Benzidine Yellow, Threne Quinoline Yellow, Pigment Yellow, Permanent Orange GTR, Pyrazolone Orange, Vulcan Orange, Watchung Red, Permanent Red, Brilliant Carmine 3B, Brilliant Carmine 6B, DuPont Oil Red, Pyrazolone Red, Lithol Red, Rhodanmine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes and thiazole dyes.

The colorants may be used alone or in combination of two or more thereof.

As the colorant, a surface-treated colorant may be used as necessary, or the colorant may be used in combination with a dispersant. Plural of kinds of colorants may be used in combination.

A content of the colorant is preferably, for example, 1% by mass or more and 30% by mass or less, and more preferably 3% by mass or more and 15% by mass or less, with respect to the total toner particles.

—Release Agent—

Examples of the mold releasing agent include hydrocarbon wax, natural wax such as carnauba wax, rice wax, and candelilla wax, synthetic or mineral/petroleum wax such as montan wax, and ester wax such as fatty acid ester and montanic acid ester.

The melting temperature of the release agent is preferably 50° C. or higher and 110° C. or lower, and more preferably 60° C. or higher and 100° C. or lower.

The melting temperature is obtained from the DSC curve obtained by differential scanning calorimetry (DSC) according to the "melting peak temperature" of a method for obtaining the melting temperature described in JIS K 7121-1987 "Method for measuring transition temperature of plastics".

A content of the release agent is preferably, for example, 1 mass % or more and 20 mass % or less, and more preferably 5 mass % or more and 15 mass % or less, based on the total toner particles.

—Alkali Metal Element Supply Source—

From a viewpoint of setting the Net intensity $N_A$ to 0.10 kcps or more and 1.20 kcps or less, the toner particles preferably include the alkali metal element supply source.

Examples of the alkali metal element supply source include an additive containing an alkali metal element (such as a surfactant and an aggregating agent). Specific examples of the additive containing an alkali metal element include a salt containing an alkali metal element.

Examples of the salt containing an alkali metal element include: a salt containing a lithium element, such as lithium chloride, lithium sulfate, and lithium nitrate; a salt containing a sodium element, such as sodium chloride, sodium sulfate, and sodium nitrate; a salt containing a potassium element, such as potassium chloride, potassium sulfate, and potassium nitrate; a salt containing a rubidium element, such as rubidium chloride, rubidium sulfate, and rubidium nitrate; a salt containing a cesium element, such as cesium chloride, cesium sulfate, and cesium nitrate; and a salt containing a francium element, such as francium chloride, francium sulfate, and francium nitrate.

Examples of the salt containing an alkali metal element also include a salt containing an alkali metal sulfonate element (such as sodium alkylbenzene sulfonate such as sodium dodecylbenzene sulfonate).

—Alkaline Earth Metal Element Supply Source—

Examples of the alkaline earth metal element supply source include an additive containing an alkaline earth metal element (such as a surfactant and an aggregating agent). Specific examples of the additive containing an alkaline earth metal element include a salt containing an alkaline earth metal element.

Specific examples of the salt containing an alkaline earth metal element include: a salt containing a beryllium element such as beryllium chloride, beryllium sulfate, and beryllium nitrate; a salt containing a magnesium element such as magnesium chloride, magnesium sulfate, and magnesium nitrate; a salt containing a calcium element such as calcium chloride, calcium sulfate, and calcium nitrate; a salt containing a strontium element such as strontium chloride, strontium sulfate, and strontium nitrate; a salt containing a barium element such as barium chloride, barium sulfate, and barium nitrate; and a salt containing a radium element such as radium chloride, radium sulfate, and radium nitrate.

Examples of the salt containing an alkaline earth metal element include a salt containing an alkaline earth metal sulfonate element (such as calcium alkylbenzene sulfonate such as calcium dodecylbenzene sulfonate) and a metal sulfide salt (such as calcium polysulfide).

The salt containing an alkali metal element is preferably a salt containing a sodium element such as sodium chloride, sodium sulfate, or sodium nitrate.

The salt containing an alkaline earth metal element is preferably a salt containing a magnesium element such as magnesium chloride, magnesium sulfate, or magnesium nitrate, or a salt containing a calcium element such as calcium chloride, calcium sulfate, or calcium nitrate, and more preferably a salt containing a magnesium element such as magnesium chloride, magnesium sulfate, or magnesium nitrate.

A total content of the alkali metal element supply source and the alkaline earth metal element supply source in the toner particles may be added such that the Net intensity $N_A$ is 0.10 kcps or more and 1.20 kcps or less.

—Cl Element Supply Source—

The toner particles preferably include a Cl element supply source from a viewpoint of setting the Net intensity $N_{Cl}$ of a Cl element to 0.05 kcps or more and 1.30 kcps or less.

Examples of the Cl element supply source is an additive (such as an aggregating agent) containing the Cl element. Specifically, examples of the additive containing the Cl element include chlorides. Examples of the chlorides include ammonium chloride, aluminum chloride, polyaluminum chloride, iron (II) chloride, zinc chloride, alkali metal chloride (such as lithium chloride, sodium chloride, potassium chloride, rubidium chloride, cesium chloride, and francium chloride), and alkaline earth metal chloride (such as beryllium chloride, magnesium chloride, strontium chloride, barium chloride, and radium chloride).

—S Element Supply Source—

The toner particle may contain an S element supply source.

Examples of an S element supply source include sulfur-containing additives (such as a surfactant, an aggregating agent, a chain transfer agent, and an initiator). Specific examples of a sulfur supply source include a metal sulfate, a metal sulfonate, and a metal sulfide.

Examples of the metal sulfate include alkali metal sulfate (such as lithium sulfate, sodium sulfate, potassium sulfate, rubidium sulfate, cesium sulfate, and francium sulfate), alkaline earth metal sulfate (such as beryllium sulfate, magnesium sulfate, calcium sulfate, strontium sulfate, barium sulfate, and radium sulfate), aluminum sulfate, and polyiron sulfate (II).

Examples of the sulfonic acid metal salt include alkylbenzene sulfonic acid metal salts (such as sodium dodecylbenzene sulfonate, and calcium dodecylbenzene sulfonate).

Examples of the sulfide include calcium polysulfide.

—Other Additives—

Examples of other additives include known additives such as magnetic materials, charge control agents, and inorganic powders. These additives are contained in the toner particle as internal additives.

—Net Intensity—

A total Net intensity $N_A$ of an alkali metal element and an alkaline earth metal element in the toner particle measured by fluorescence X-ray analysis is 0.10 kcps or more and 1.20 kcps or less.

From a viewpoint that the external additive is more likely to adhere to the toner surface and the two-layer structure of the external additive is more likely to be maintained, the Net intensity $N_A$ is preferably 0.20 kcps or more and 1.00 kcps or less.

The total Net intensity $N_A$ of the alkali metal element and the alkaline earth metal element is calculated by measuring the Net intensity of the alkali metal element and the Net intensity of the alkaline earth metal element by the following method and summing the measured values.

A method of measuring the Net intensity of the alkali metal element and the Net intensity of the alkaline earth metal element is as follows.

About 0.12 g of the toner particles (or the toner including the toner particles and the external additive) is compressed by using a compression molding machine under a pressure of a load of 6t for 60 seconds to prepare a disk having a diameter of 50 mm and a thickness of 2 mm. Using this disc as a sample, qualitative and quantitative element analysis is performed under the following conditions by using a scanning fluorescence X-ray analysis device (ZSX Primus II manufactured by Rigaku Corporation) to obtain the Net intensity (unit: kilo counts per second, kcps) of each of the alkali metal element and the alkaline earth metal element. Then, the Net intensity $N_A$ is calculated by summing the Net intensity of the alkali metal element and the Net intensity of the alkaline earth metal element.

Tube voltage: 40 kV
Tube current: 70 mA
Anticathode: rhodium
Measurement time: 15 minutes
Analysis diameter: 10 mm in diameter From the viewpoint that the adsorbed moisture further facilitates the adhesion, and the two-layer structure of the external additive is more likely to be maintained, the alkali metal element and the alkaline earth metal element preferably contain at least one selected from a group consisting of Na, Mg, and Ca.

From the viewpoint that the adsorbed moisture is more likely to adhere to the elements, and the two-layer structure of the external additive is more likely to be maintained, the alkali metal element and the alkaline earth metal element preferably contain at least one selected from a group consisting of Na and Mg.

A Net intensity $N_N$ of a Na element measured by the fluorescence X-ray analysis is preferably 0.01 kcps or more and 0.20 kcps or less, more preferably 0.02 kcps or more and 0.15 kcps or less, and still more preferably 0.03 kcps or more and 0.10 kcps or less.

A Net intensity $N_M$ of the Mg element measured by the fluorescence X-ray analysis is preferably 0.10 kcps or more and 1.20 kcps or less, more preferably 0.15 kcps or more and 1.00 kcps or less, and still more preferably 0.20 kcps or more and 0.80 kcps or less.

A Net intensity $N_C$ of the Ca element measured by the fluorescence X-ray analysis is preferably 0.01 kcps or more and 0.20 kcps or less, more preferably 0.05 kcps or more and 0.15 kcps or less, and still more preferably 0.08 kcps or more and 0.10 kcps or less.

Here, the Net intensity $N_N$ of the Na element, the Net intensity $N_M$ of the Mg element, and the Net intensity $N_C$ of the Ca element measured by the fluorescence X-ray analysis are measured in the same procedure as the method of measuring the Net intensity of the alkali metal element and the Net intensity of the alkaline earth metal element, except that the Net intensity $N_N$ of the Na element, the Net intensity $N_M$ of the Mg element, and the Net intensity $N_C$ of the Ca element are obtained in the qualitative and quantitative element analysis.

In the toner according to the present exemplary embodiment, the Net intensity $N_{Cl}$ of the Cl element in the toner particle measured by the fluorescence X-ray analysis is preferably 0.05 kcps or more and 1.30 kcps or less, more preferably 0.10 kcps or more and 1.20 kcps or less, and still more preferably 0.20 kcps or more and 1.10 kcps or less.

By setting the Net intensity $N_{Cl}$ of the Cl element to be within the above range, the image density unevenness may be prevented when the images having the low image density are continuously formed under a low temperature and low humidity environment and then the secondary color image having a high image density is formed. A reason thereof is presumed as follows.

Since the Cl element is also present on the toner particle surface side, the adsorbed moisture tends to adhere to the Cl element. Therefore, when the toner particle contains the Cl element such that the Net intensity $N_{Cl}$ is within the above range, a state in which a large amount of adsorbed moisture is contained on the toner particle surface may be likely to occur. Therefore, the external additive may be more likely to adhere to the toner particle surface.

Accordingly, it is presumed that by setting the Net intensity $N_{Cl}$ of the Cl element to be within the above range, the image density unevenness may be prevented when the images having the low image density are continuously formed under the high temperature and high humidity environment and then the secondary color image having a high image density is formed.

Here, the Net intensity $N_{Cl}$ of the Cl element is measured in the same procedure as the method of measuring the Net intensity of the alkali metal element and the Net intensity of the alkaline earth metal element, except that the Net intensity $N_{Cl}$ of the Cl element is obtained in the qualitative and quantitative element analysis.

A ratio ($N_{Cl}/N_A$) of the Net intensity $N_{Cl}$ of the Cl element to the total Net intensity $N_A$ of the alkali metal element and the alkaline earth metal element is preferably 0.05 or more and 6.5 or less, more preferably 0.1 or more and 5.0 or less, and still more preferably 0.5 or more and 4.5 or less.

When the ratio ($N^{Cl}/N_A$) is within the above range, the state in which a large amount of adsorbed moisture is contained on the toner particle surface may be more likely to occur.

—Shape of Toner Particle—

A volume average particle diameter (D50v) of the toner particle is preferably 2 μm or more and 10 μm or less, and more preferably 4 μm or more and 8 μm or less.

Various average particle diameters and various particle size distribution indexes of the toner particles are measured using a Coulter Multisizer II (manufactured by Beckman Coulter, Inc.) and the electrolytic solution is ISOTON-II (manufactured by Beckman Coulter, Inc.).

In the measurement, 0.5 mg or more and 50 mg or less of a measurement sample is added to 2 ml of a 5 mass % aqueous solution of a surfactant (preferably sodium alkylbenzenesulfonate) as a dispersant. The obtained mixture is added to 100 ml or more and 150 ml or less of the electrolytic solution.

The electrolytic solution in which the sample is suspended is subjected to a dispersion treatment for 1 minute with an ultrasonic disperser, and the Coulter Multisizer II is used to measure the particle diameter distribution of particles having a particle diameter in the range of 2 μm or more and 60 μm or less using an aperture having an aperture diameter of 100 μm. The number of the particles sampled is 50,000.

A divided particle size range (channel) is set, and a volume based particle size distribution and a number based particle size distribution are measured. Then, cumulative distributions of the volume based and the number based particle size distributions are drawn from a small diameter side, and particle diameters at which a cumulative percentage is 16% are respectively defined as a volume particle diameter D16v and a number particle diameter D16p, particle diameters at which the cumulative percentage is 50% are defined as a volume average particle diameter D50v and a cumulative number average particle diameter D50p, and particle diameters at which the cumulative percentage is 84% are defined as a volume particle diameter D84v and a number particle diameter D84p.

Using these, the volume particle size distribution index (GSDv) is calculated as $(D84v/D16v)^{1/2}$, and the number particle size distribution index (GSDp) is calculated as $(D84p/D16p)^{1/2}$.

An average circularity of the toner particle is preferably 0.94 or more and 1.00 or less, and more preferably 0.95 or more and 0.98 or less.

The average circularity of the toner particle is obtained by (circle equivalent perimeter)/(perimeter) [(perimeter of circle having the same projected area as the particle image)/(perimeter of particle projection image)]. Specifically, the average circularity of the toner particle is a value measured by the following method.

First, the toner (developer) to be measured is dispersed in water containing a surfactant, and then an ultrasonic treatment is performed to obtain toner particles from which the external additive is removed. The toner particles to be measured in which the external additive in removed are sucked and collected to form a flat flow, and flash light is emitted instantly to capture a particle image as a still image. The average circularity is obtained by a flow particle image analysis apparatus (FPTA-3000 manufactured by Sysmex Corporation) that analyzes the particle image. The number of samples for obtaining the average circularity is 3,500.

(External Additive)

The toner according to the present exemplary embodiment includes the silica particle having a circularity of more than 0.5 and 0.9 or less and a volume average particle diameter of more than 100 nm and 300 nm or less as the external additive.

—Silica Particle—

Examples of the silica particles include dry silica particles and wet silica particles.

Examples of the dry silica particles include combusted silica (fumed silica) obtained by combusting a silane compound, and deflagrated silica obtained by explosively combusting a metal silicon powder.

Examples of the wet silica particles include wet silica particles obtained by a neutralization reaction of sodium silicate and mineral acid (precipitated silica synthesized and aggregated under an alkali condition, gel method silica particles synthesized and aggregated under an acidic condition, or the like), colloidal silica particles (silica sol particles or the like) obtained by polymerizing acidic silicic acid to make it alkaline, and sol-gel method silica particles obtained by hydrolysis of an organic silane compound (for example, alkoxysilane).

Among these, the silica particles are preferably wet silica particles from a viewpoint of easily controlling the circularity and the volume average particle diameter of the silica particles.

The circularity of the silica particle is more than 0.5 and 0.9 or less.

When the circularity of the silica particle is more than 0.5, the silica particle may be less likely to have a rod-like shape, and may be easily prevented from being embedded in the toner particle.

When the circularity of the silica particle is 0.9 or less, the silica particle may be easily prevented from rolling on the toner particle surface.

From a viewpoint of further preventing the toner in which the external additive is embedded in the toner particle and the toner in which the external additive is unevenly distributed, the circularity of the silica particle is preferably 0.55 or more and 0.85 or less, more preferably 0.60 or more and 0.80 or less, and still more preferably 0.65 or more and 0.75 or less.

The circularity of the silica particle is measured by the following method.

First, the silica particles are observed by an SEM device and are obtained as "100/SF2" calculated by the following formula from planar image analysis of the obtained silica particles.

$$\text{Circularity } (100/SF2)=4\pi\times(A/I^2) \qquad \text{Formula:}$$

In the formula, I represents a perimeter of the primary particles on the image, and A represents a projection area of the silica particles.

The circularity of the silica particles is obtained as 50% circularity in a cumulative frequency of the circularity of 100 silica particles obtained by the planar image analysis.

The volume average particle diameter of the silica particle is more than 100 nm and 300 nm or less.

When the volume average particle diameter of the silica particle is more than 100 nm, the silica particle may be easily prevented from being embedded in the toner particle.

When the volume average particle diameter of the silica particle is 300 nm or less, the silica particle may be less likely to be released from the toner particle.

From the viewpoint of further preventing the toner in which the external additive is embedded in the toner particle and the toner in which the external additive is released, the volume average particle diameter of the silica particle is preferably from 120 nm or more and 275 nm or less, more preferably 130 nm or more and 250 nm or less, and still more preferably 140 nm or more and 225 nm or less.

Here, the volume average particle diameter of the silica particle is measured by the following method.

The silica particles are observed by a scanning electron microscope (SEM) device (S-4100, manufactured by Hitachi, Ltd.) to take an image, the image is taken into an image analyzer (LUZEX 111, manufactured by Nireco Corporation), an area of each particle is measured by image analysis of the silica particles, and an equivalent circle diameter is calculated based on the area value. The calculation of the equivalent circle diameter is performed for 100 silica particles. Then, a 50% diameter (D50v) in a cumulative frequency on a volume basis of the obtained equivalent circle diameter is defined as the volume average particle diameter of the silica particles.

The electron microscope adjusts the magnification so that about 10 or more and 50 or less silica particles are shown in one field of view, and observes plural fields of view to obtain the equivalent circle diameter of the silica particles.

The silica particle may be a primary particle having a circularity of more than 0.5 and 0.9 or less and a volume average particle diameter of more than 100 nm and 300 nm or less, or may be an aggregate of the silica primary particles formed so as to have a circularity of more than 0.5 and 0.9 or less and a volume average particle diameter of more than 100 nm and 300 nm or less.

From a viewpoint of increasing a tendency to be more irregular, the silica particle is preferably an aggregate of silica primary particles having a volume average particle diameter of 10 nm or more and 90 nm or less.

The aggregate of the silica primary particles having the volume average particle diameter of 10 nm or more and 90 nm or less tends to have a more irregular shape, and the silica particle may be less likely to roll on the toner particle.

The volume average particle diameter of the silica primary particles constituting the aggregate is more preferably 20 nm or more and 80 nm or less, and still more preferably 30 nm or more and 70 nm or less, from the viewpoint of further forming the aggregate into irregular shapes.

Here, the calculation of the volume average particle diameter of the silica primary particles is performed in the same procedure as that of the silica particle.

The aspect ratio of the aggregate is preferably 1.4 or more and 5.5 or less.

When the aspect ratio of the aggregate is within the above range, the aggregate is less likely to have a shape close to a the sphere or a rod-like shape, and the embedding of the aggregate in the toner particles or aggregation of the aggregate may be easily prevented.

The aspect ratio of the aggregate is more preferably 1.5 or more and 5.0 or less, and still more preferably 1.7 or more and 4.0 or less.

The aspect ratio of the aggregate is measured by the following method.

The aggregates are observed by the scanning electron microscope (SEM) device (S-4100, manufactured by Hitachi, Ltd) to take an image, the image is taken into the image analyzer (LUZEX III, manufactured by Nireco Corporation). A length of the aggregate in a long axis direction and a length of the aggregate in a short axis direction are calculated by image analysis of the aggregate. Here, the length of the aggregate in the long axis direction refers to a longest length of a line segment among line segments connecting two points on a contour of the aggregate in the image. Further, the length of the aggregate in the short axis direction refers to a shortest length of a line segment among line segments that are orthogonal to a straight line parallel to the length of the aggregate in the long axis direction and that connect two points on the contour of the aggregate in the image. The length of the aggregate in the long axis direction and the length of the aggregate in the short axis direction are calculated for 100 aggregates. Then, an average length of the aggregates in the long axis direction and an average length of the aggregates in the short axis direction are calculated from the obtained values. When the average length of the aggregates in the short axis direction is defined as 1, the average length of the aggregates in the long axis direction is defined as the aspect ratio of the aggregates.

Surfaces of the silica particles may be subjected to a hydrophobization treatment.

The hydrophobization treatment agent is not particularly limited, and examples thereof include a silane coupling agent, a silicone oil, a titanate coupling agent, and an aluminum coupling agent. The hydrophobization treatment agent may be used alone or in combination of two or more thereof.

An amount of the hydrophobization treatment agent is generally, for example, 1 part by mass or more and 50 parts by mass or less based on 100 parts by mass of the silica particles.

As the hydrophobization treatment agent, at least one of a silane coupling agent and silicone oil is preferably used.

Specific examples of the silane coupling agent and the silicone oil include the hydrophobization treatment agent used for the alumina particles described above.

A content of the silica particles is, with respect to the toner particles, preferably 0.5 mass % or more and 5.0 mass % or less, more preferably 0.8 mass % or more and 4.6 mass % or less, and still more preferably 1.0 mass % or more and 1.2 mass % or less.

—Method for Producing Silica Particles—

The method for producing the silica particles is not particularly limited as long as silica particles having a circularity of more than 0.5 and 0.9 or less and a volume average particle diameter of more than 100 nm and 300 nm or less are obtained.

Examples of the method for producing the silica particles include a dry method in which large-diameter silica particles are pulverized and classified, and a wet method in which particles are generated by a sol-gel method.

From a viewpoint of easily setting the circularity and the volume average particle diameter of the silica particles within the above ranges, the wet method is preferably used as the method for producing silica particles.

The method for producing silica particles preferably includes, for example, a step (hereinafter, referred to as a preparing step) of preparing a solution containing an alkali catalyst, and a step (hereinafter, referred to as a particle generating step) of generating the silica particles by supplying tetraalkoxysilane and the alkali catalyst to the solution containing the alkali catalyst.

Preparing Step

The preparing step is a step of adding the alkali catalyst to a solvent to prepare the solution containing the alkali catalyst.

The alkali catalyst is not particularly limited as long as it is a catalyst capable of promoting a hydrolysis reaction or a condensation reaction of tetraalkoxysilane, and examples thereof include ammonia, urea, monoamine, and quaternary ammonium salts.

The solvent is not particularly limited, and is preferably a solvent containing an alcohol. The alcohol is preferably, for example, an alcohol having 5 or less carbon atoms. Examples of the alcohol include methanol, ethanol, 1-propanol, and 2-propanol.

A concentration of the alkali catalyst is preferably 0.6 mol/L or more and 0.85 mol/L or less, more preferably 0.63 mol/L or more and 0.78 mol/L or less, and still more preferably 0.66 mol/L or more and 0.75 mol/L or less.

•Particle Generating Step

The particle generating step is a step of generating the silica particles by adding tetraalkoxysilane and the alkali catalyst to the solution containing the alkali catalyst and causing the tetraalkoxysilane and the alkali catalyst to react with each other.

The particle generating step preferably includes a first supplying step, an aging step, and a second supplying step in this order.

First Supplying Step

The first supplying step is a step of adding the tetraalkoxysilane and the alkali catalyst to the solution containing the alkali catalyst.

Examples of tetraalkoxysilane include tetramethoxysilane, tetraethoxysilane, tetrapropoxysilane, and tetrabutoxysilane, and at least one of tetramethoxysilane and tetraethoxysilane is preferably used.

An addition amount of tetraalkoxysilane is preferably 0.002 mol or more and 0.008 mol or less with respect to 1 mol of the alcohol contained in the solution containing the alkali catalyst.

An addition rate of the tetraalkoxysilane is preferably 0.001 mol or more and 0.010 mol or less, more preferably 0.0065 mol or more and 0.0085 mol or less, and still more preferably 0.007 mol or more and 0.008 mol or less, per minute, with respect to 1 mol of the alcohol contained in the solution containing the alkali catalyst.

Examples of the alkali catalyst added in the first supplying step include those exemplified in the preparing step.

An addition amount of the alkali catalyst is preferably 0.1 mol or more and 0.4 mol or less, more preferably 0.14 mol or more and 0.35 mol or less, and still more preferably 0.18 mol or more and 0.30 mol or less, with respect to 1 mol of the tetraalkoxysilane.

It is preferable to add the alkali catalyst such that an addition rate of the alkali catalyst becomes the above ratio with respect to the addition amount of the tetraalkoxysilane supplied per minute.

Aging Step

The aging step is a step of stopping the addition of the tetraalkoxysilane and the alkali catalyst for a certain period of time after the first supplying step.

Through this step, the circularity of the silica particles may be likely to be more than 0.5 and 0.9 or less, and the volume average particle diameter may be likely to be more than 100 nm and 300 nm or less.

The period of time for which the addition of the tetraalkoxysilane and the alkali catalyst is stopped is preferably 0.5 minutes or more and 10 minutes or less, more preferably 0.6 minutes or more and 5 minutes or less, and still more preferably 0.8 minutes or more and 3 minutes or less.

Second Supplying Step

The second supplying step is a step of adding the tetraalkoxysilane anti the alkali catalyst again after the aging step.

In the second supplying step, preferable ranges of a type, an addition amount, and an addition rate of the tetraalkoxysilane, and a type, an addition amount, and an addition rate of the alkali catalyst are the same as those in the first supplying step, and may be different from those in the first supplying step.

A temperature of a reaction solution in the first supplying step, the aging step, and the second supplying step is, for example, preferably 5° C. or high and 50° C. or lower, and more preferably 15° C. or higher and 40° C. or lower.

The method for producing silica particles according to the present exemplary embodiment may include, after the second supplying step, one or more aging steps, and may further include a supplying step for supplying the tetraalkoxysilane and the alkali catalyst.

Through the above steps, the silica particles are obtained. The obtained silica particles are obtained in a state of a dispersion liquid, and may be used as a silica particle dispersion liquid as it is, or may be taken out and used as a powder of the silica particles after removing the solvent.

The method for producing silica particles according to the present exemplary embodiment may include a hydrophobization treatment step after the second supplying step.

Hydrophobization Treatment Step

The hydrophobization treatment step is a step of treating the silica particle surface with a hydrophobization treatment agent.

When the silica particles are obtained in the state of the dispersion liquid, for example, a hydrophobized silica particle dispersion liquid may be obtained by adding a necessary amount of the hydrophobization treatment agent to the silica particle dispersion liquid and reacting the dispersion liquid and the treatment agent while stirring in a temperature range of 30° C. or higher and 80° C. or lower.

When the silica particles are obtained in a powder state, for example, the hydrophobized powder silica particles may be obtained by adding a necessary amount of the hydrophobization treatment agent to the powder silica particles and reacting the silica particles and the treatment agent while stirred in a temperature range of 80° C. or higher and 300° C. or lower.

—Other External Additives—

As the external additive, an external additive other than the silica particles may be used in combination.

Examples of other external additives include inorganic particles. Examples of the inorganic particles include $TiO_2$, CuO, ZnO, $SnO_2$, $CeO_2$, $Fe_2O_3$, MgO, BaO, CaO, $K_2O$, $Na_2O$, $ZrO_2$, $CaO·SiO_2$, $K_2O·(TiO_2)_n$, $Al_2O_3·2SiO_2$, $CaCO_3$, $MgCO_3$, $BaSO_4$, and $MgSO_4$.

Surfaces of the inorganic particles as the other external additive may be subjected to the hydrophobization treatment. The hydrophobization treatment is performed by, for example, immersing the inorganic particles in the hydrophobization treatment agent. The hydrophobization treatment agent is not particularly limited, and examples thereof include a silane coupling agent, a silicone oil, a titanate coupling agent, and an aluminum coupling agent. The hydrophobization treatment agent may be used alone or in combination of two or more thereof.

An amount of the hydrophobization treatment agent is generally, for example, 1 part by mass or more and 10 parts by mass or less with respect to 100 parts by mass of the inorganic particles.

Examples of the other external additive also include resin particles (resin particles of polystyrene, polymethylmethacrylate (PMMA), and melamine resin), and cleaning activators (such as metal salts of higher fatty acids typified by zinc stearate, and fluoropolymer particles).

An external addition amount of the other external additive is, for example, preferably 0.01 mass % or more and 5 mass % or less, and more preferably 0.01 mass % or more and 2.0 mass % or less, based on the toner particles.

—Characteristics of Toner—

In the toner according to the present exemplary embodiment, a maximum endothermic peak temperature in first heating performed by a differential scanning calorimeter (DSC) is preferably 58° C. or higher and 75° C. or lower. When the maximum endothermic peak temperature of the toner is 58° C. or higher and 75° C. or lower, low-temperature fixability of the toner may be improved.

The maximum endothermic peak temperature of the toner in the first heating by the differential scanning calorimeter (DSC) is measured as follows.

A differential scanning calorimeter DSC-7 manufactured by PerkinElmer Inc. is used, melting points of indium and zinc are used for temperature correction of a detection unit of the calorimeter, and heat of fusion of indium is used for correction of a calorific value. An aluminum pan is used as a sample, an empty pan is set for comparison, and a temperature is increased from a room temperature to 150° C. at a temperature rising rate of 10° C./min. Then, in an obtained endothermic curve, a temperature giving the maximum endothermic peak is obtained.

—Method for Producing Toner Particles—

The toner according to the present exemplary embodiment is obtained by preparing the toner particles and then externally adding an external additive to the toner particles.

The toner particles may be produced by either a dry production method (such as a kneading pulverization method) or a wet production method (such as an aggregation and coalescence method, a suspension polymerization method, and a dissolution suspension method). These production methods are not particularly limited, and known production methods are adopted. Among these, the toner particles are preferably obtained by the aggregation and coalescence method.

Specifically, in the case of producing the toner particles by the aggregation and coalescence method, the toner particles are produced by, for example, a step of preparing a resin particle dispersion liquid in which resin particles serving as a binder resin are dispersed (resin particle dispersion liquid preparation step), a step of aggregating resin particles (if necessary other particles) in the resin particle dispersion liquid (in a dispersion liquid after mixing other particle dispersion liquids if necessary), to form aggregated particles (aggregated particle forming step), and a step of heating an aggregated particle dispersion liquid in which the aggregated particles are dispersed to fuse and coalesce the aggregated particles to form toner particles (fusion and coalesce step).

Here, in order to set the Net intensity of each element in the toner particle within the above range, the supply source of the respective element may be added in the production process of the toner particle.

Hereinafter, details of each step will be described.

In the following description, a method for obtaining toner particles containing a colorant and a release agent will be described, but the colorant and the release agent are used as necessary. Of course, other additives other than the colorant and the release agent may be used.

—Resin Particle Dispersion Liquid Preparation Step—

First, a colorant particle dispersion liquid in which colorant particles are dispersed and a release agent particle dispersion liquid in which release agent particles are dispersed are prepared together with a resin particle dispersion liquid in which resin particles serving as a binder resin are dispersed.

Here, the resin particle dispersion liquid is prepared, for example, by dispersing resin particles in a dispersion medium with a surfactant.

Examples of the dispersion medium for use in the resin particle dispersion liquid include an aqueous medium.

Examples of the aqueous medium include water such as distilled water and ion-exchanged water, and alcohols. The aqueous medium may be used alone or in combination of two or more thereof.

Examples of the surfactant include sulfate ester salt-based, sulfonate-based, phosphate ester-based, and soap-based anionic surfactants; amine salt-based and quaternary ammonium salt-based cationic surfactants; and polyethylene glycol-based, alkylphenol ethylene oxide adduct-based, and polyhydric alcohol-based nonionic surfactants. Among these, anionic surfactants and cationic surfactants are particularly preferred. The nonionic surfactant may be used in combination with an anionic surfactant or a cationic surfactant.

The surfactant may be used alone or in combination of two or more thereof.

For the resin particle dispersion liquid, examples of a method of dispersing the resin particles in the dispersion medium include general dispersion methods using a rotary shearing homogenizer, a ball mill having a media, a sand mill, and a dyno mill, or the like. Depending on a kind of the resin particles, the resin particles may be dispersed in the dispersion liquid by using a phase inversion emulsification method.

The phase inversion emulsification method is a method of dispersing a resin in an aqueous medium in a form of particles by dissolving a resin to be dispersed in a hydrophobic organic solvent in which the resin is soluble, adding a base to an organic continuous phase (O phase) for neutralization, and then adding an aqueous medium (W phase) to convert the resin from W/O to O/W (so-called phase inversion) to form a discontinuous phase.

A volume average particle diameter of the resin particles dispersing in the resin particle dispersion liquid is preferably, for example, 0.01 μm or more and 1 μm or less, more preferably 0.08 μm or more and 0.8 μm or less, and still more preferably 0.1 μm or more and 0.6 μm or less.

The volume average particle diameter D50v of the resin particles is caluculated by the volume-based particle size distribution obtained by measurement of a laser diffraction-type particle diameter distribution measurement device (such as LA-700 manufactured by Horiba, Ltd.). A divided particle size range (so-called channels) is set, and the volume-based particle size distribution is obtained. Then, a cumulative distribution is drawn from a small particle diameter side and a particle diameter corresponding to the cumulative percentage of 50% with respect to all the particles is the volume average particle diameter D50v. A volume average particle diameter of the particles in other dispersion liquids is measured in the same manner.

A content of the resin particles contained in the resin particle dispersion liquid is preferably 5 mass % or more and 50 mass % or less, and more preferably 10 mass % or more and 40 mass % or less.

For example, the colorant particle dispersion liquid and the release agent particle dispersion liquid are prepared in the same manner as the resin particle dispersion liquid. That is, regarding the volume average particle diameter of particles, the dispersion medium, the dispersion method, and the content of the particles in the resin particle dispersion liquid, the same applies to the colorant particles dispersed in the colorant particle dispersion liquid and the release agent particles dispersed in the release agent particle dispersion liquid.

—Aggregated Particle Forming Step—

Next, the resin particle dispersion liquid, the colorant particle dispersion liquid, and the release agent particle dispersion liquid are mixed.

Then, in the mixed dispersion liquid, the resin particles, the colorant particles, and the release agent particles are hereto aggregated to form aggregated particles containing the resin particles, the colorant particles, and the release agent particles, which have a diameter close to a diameter of target toner particles.

Specifically, for example, an aggregating agent is added to the mixed dispersion liquid, a pH of the mixed dispersion liquid is adjusted to acidic (such as a pH of 2 or more and 5 or less), and a dispersion stabilizer is added if necessary. Then, the resin particles are heated to a temperature (specifically, for example, "the glass transition temperature of resin particles −30° C." or higher and "the glass transition temperature −10° C." or lower) of a glass transition temperature to aggregate the particles dispersed in the mixed dispersion liquid, and thus the aggregated particles are formed.

In the aggregated particle forming step, for example, the aggregating agent may be added at room temperature (for example, 25° C.) while stirring the mixed dispersion liquid with a rotary shearing homogenizer, the pH of the mixed dispersion may be adjusted to be acidic (for example, pH 2 or more and 5 or less), a dispersion stabilizer may be added as necessary, and then heating may be performed.

Examples of the aggregating agent include a surfactant having a polarity opposite to that of the surfactant used as a dispersant added in the mixed dispersion liquid, an inorganic metal salt, and a divalent or higher metal complex. In particular, when the metal complex is used as the aggregating agent, an amount of the surfactant used is reduced and chargeability is improved.

If necessary, an additive that forms a complex or a similar bond with the metal ion of the aggregating agent may be used. A chelating agent is preferably used as the additive.

Examples of the inorganic metal salt include: metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

A water-soluble chelating agent may be used as the chelating agent. Examples of the chelating agent include oxycarboxylic acids such as tartaric acid, citric acid and gluconic acid, iminodiacetic acid (IDA), nitrilotriacetic acid (NTA), and ethylenediaminetetraacetic acid (EDTA).

An addition amount of the chelating agent is preferably 0.01 part by mass or more and 5.0 parts by mass or less, and more preferably 0.1 part by mass or more and less than 3.0 parts by mass, based on 100 parts by mass of the resin particles.

—Fusion and Coalescence Step—

Next, the aggregated particle dispersion liquid in which the aggregated particles are dispersed is heated to, for example, a temperature equal to or higher than the glass transition temperature of the resin particles (such as a temperature higher than the glass transition temperature of the resin particles by 10° C. to 30° C.) to fuse and coalesce the aggregated particles to form the toner particles.

The toner particles are obtained through the above steps.

The toner particles may also be produced by a step of forming second aggregated particles by obtaining an aggregated particle dispersion liquid in which aggregated particles are dispersed, and then further mixing the aggregated particle dispersion liquid and a resin particle dispersion liquid in which resin particles are dispersed to further adhere and aggregate the resin particles to the surface of the aggregated particles, and a step of forming core-shell structure toner particles by heating a second aggregated particle dispersion liquid in which the second aggregated particles are dispersed to fuse and coalesce the second aggregated particles.

Here, after the fusion and coalesce step, the toner particles formed in the solution are subjected to a known washing step, a solid-liquid separation step, and a drying step to obtain dried toner particles.

In the washing step, from the viewpoint of chargeability, it is preferable to sufficiently perform displacement washing with ion-exchanged water. The solid-liquid separation step is not particularly limited, and absorption filtration, pressure filtration or the like may be performed from a viewpoint of productivity. The drying step is not particularly limited either, and freeze-drying, air-flow drying, fluid-drying, vibration-type fluid-drying or the like may be performed from the viewpoint of productivity.

Then, the toner according to the present exemplary embodiment are produced, for example, by adding an external additive to the obtained dried toner particles and performing mixing. The mixing may be performed by, for example, a V blender, a Henschel mixer, or a Loedige mixer. Further, if necessary, coarse particles in the toner may be removed by using a vibration sieving machine, a wind sieving machine, or the like.

<Electrostatic Charge image Developer>

The electrostatic charge image developer according to the present exemplary embodiment at least includes the toner according to the present exemplary embodiment.

The electrostatic charge image developer according to the present exemplary embodiment may be a one-component developer containing only the toner according to the present exemplary embodiment, or may be a two-component developer in which the toner and a carrier are mixed.

The carrier is not particularly limited, and examples thereof include known carriers. Examples of the carrier include a coated carrier in which a surface of a core made of a magnetic powder is coated with a coating resin; a magnetic powder dispersion-type carrier in which a magnetic powder is dispersed and blended in a matrix resin; and a resin impregnation-type carrier in which a porous magnetic powder is impregnated with a resin.

The magnetic powder dispersion-type carrier and the resin impregnation-type carrier may be carriers in which constituent particles of the carrier are core materials, and the core material is coated with a coating resin.

Examples of the magnetic powder include magnetic metals such as iron, nickel, and cobalt, and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured to include an organosiloxane bond or a modified product thereof, a fluororesin, polyester, polycarbonate, a phenol resin, and an epoxy resin.

The coating resin and the matrix resin may contain other additives such as conductive particles.

Examples of the conductive particles include particles of metals such as gold, silver, copper, and particles of carbon black, titanium oxide, zinc oxide, tin oxide, barium sulfate, aluminum borate, and potassium titanate.

Here, in order to coat surfaces of the core materials with the coating resin, a method of coating with a coating layer forming solution in which a coating resin and, if necessary, various additives are dissolved in an appropriate solvent is exemplified. The solvent is not particularly limited, and may be selected in consideration of the coating resin to be used, coating suitability, and the like.

Specific examples of the resin coating method include an immersion method in which the core material is immersed in the coating layer forming solution, a spray method in which the coating layer forming, solution is sprayed onto the surfaces of the core materials, a fluidized bed method in which the coating layer forming solution is sprayed in a state in which the core material is suspended by fluidized air, and a kneader coater method in which the core material of the carrier and the coating layer forming solution are mixed in a kneader coater and the solvent is removed.

A mixing ratio (mass ratio) of the toner to the carrier in the two-component developer is preferably toner:carrier=1:110 to 30:100, and more preferably 3:100 to 20:100.

<Image Forming Apparatus and Image Forming Method>

An image forming apparatus and an image forming method according to the present exemplary embodiment will be described.

The image forming apparatus according to the present exemplary embodiment includes: an image carrier; a charging unit that charges a surface of the image carrier; an electrostatic charge image forming unit that forms an electrostatic charge image on the surface of the charged image carrier; a developing unit that stores an electrostatic charge image developer and develops, as a toner image, the electrostatic charge image formed on the surface of the image carrier by using the electrostatic charge image developer; a transfer unit that transfers the toner image formed on the surface of the image carrier onto a surface of a recording medium; and a fixing unit that fixes the toner image transferred on the surface of the recording medium. Then, the electrostatic charge image developer according to the present exemplary embodiment is applied as the electrostatic charge image developer.

In the image forming apparatus according to the present exemplary embodiment, an image forming method (an image forming method according to the present exemplary embodiment) is performed, which includes: a charging step of charging the surface of the image carrier; an electrostatic charge image forming step of forming the electrostatic charge image on the surface of the charged image carrier; a developing step of developing, by the electrostatic charge image developer, the electrostatic charge image formed on the surface of the image carrier as the toner image; a transfer step of transferring the toner image formed on the surface of the image carrier to the surface of the recording medium; and a fixing step of fixing the toner image transferred to the surface of the recording medium.

As image forming apparatus according to the present exemplary embodiment, known image forming apparatuses are applied, for example, a direct transfer type apparatus that directly transfers the toner image formed on the surface of the image carrier onto the recording medium, an intermediate transfer type apparatus that primarily transfers the toner image formed on the surface of the image carrier onto a surface of an intermediate transfer body, and secondarily transfers the toner image transferred on the surface of the intermediate transfer body onto the surface of the recording medium, an apparatus including a cleaning unit that cleans the surface of the image carrier before the charging after the transfer of the toner image, and an apparatus including a discharging unit that performs discharging by irradiating the surface of the image carrier before the charging after the transfer of the toner image with discharging light.

When an intermediate transfer type apparatus is applied, the transfer unit includes, for example, an intermediate transfer body with a toner image transferred onto the surface thereof, a primary transfer unit that primarily transfers the toner image formed on the surface of the image carrier onto the surface of the intermediate transfer body, and a secondary transfer unit that secondarily transfers the toner image transferred on the surface of the intermediate transfer body onto the surface of the recording medium.

In the image forming apparatus according to the present exemplary embodiment, for example, a portion including the developing unit may have a cartridge structure (process cartridge) that is attached to and detached from the image forming apparatus. As the process cartridge, for example, a process cartridge including a developing unit that stores the electrostatic charge image developer according to the present exemplary embodiment is preferably used.

Hereinafter, an example of the image forming apparatus according to the present exemplary embodiment will be described, but the image forming apparatus is not limited thereto. Main parts illustrated in the drawings will be described, and description of the other parts will be omitted.

FIG. 1 is a schematic configuration diagram illustrating the image forming apparatus according to the present exemplary embodiment.

The image forming apparatus illustrated in FIG. 1 includes first to fourth electrophotographic image forming units 10Y, 10M, 10C, and 10K (image forming unit) that output images of respective colors of yellow (Y), magenta (M), cyan (C), and black (K) based on image data subjected to color separation. These image forming units (hereinafter may also be simply referred to as "units") 10Y, 10M, 10C, and 10K are arranged side by side in a horizontal direction with a predetermined distance therebetween. These units 10Y, 10M, 10C, and 10K may be process cartridges that are attached to and detached from the image forming apparatus.

In FIGS. 1, 1Y, 1M, 1C, and 1K denote photoconductors (examples of image carrier), 2Y, 2M, 2C, and 2K denote charging rollers (examples of charging units), 3Y, 3M, 3C, and 3K denote laser beams, and 6Y, 6M, 6C, and 6K denote photoconductor cleaning devices (examples of cleaning units).

Above the units 10Y, 10M, 10C, and 10K in the drawing, an intermediate transfer belt 20 as the intermediate transfer body is extended through the units. The intermediate transfer belt 20 is provided around a drive roller 22 and a support roller 24 in contact with an inner surface of the intermediate transfer belt 20, which are disposed to be separated from each other from the left to the right in the drawing, and travels in a direction from the first unit 10Y to the fourth unit 10K. A spring or the like (not illustrated) of the support roller 24 applies a force in a direction away from the drive roller 22, and tension is applied to the intermediate transfer belt 20 wound around the support roller 24 and the drive roller 22. An intermediate transfer body cleaning device 30 is provided on an image carrier side surface of the intermediate transfer belt 20 so as to face the drive roller 22.

Developing devices 4Y, 4M, 4C, and 4K (developing unit) of the units 10Y, 10M, 10C, and 10K are supplied with a toner including yellow, magenta, cyan, and black toners stored in toner cartridges 8Y, 8M, 8C, and 8K, respectively.

Since the first to fourth units 10Y, 10M, 10C, and 10K have the same configuration, here, the first unit 10Y, which is arranged on an upstream side in the traveling direction of the intermediate transfer belt and forms a yellow image, will be described as a representative. Portions equivalent to those of the first unit 10Y are denoted by adding reference numerals with magenta (M), cyan (C), and black (K) instead of yellow (Y), and descriptions of the second to fourth units 10M, 10C, and 10K are omitted.

The first unit 10Y includes a photoconductor 1Y functioning as an image carrier. Around the photoconductor 1Y, the following members are disposed in order: the charging roller 2Y (an example of the charging unit) for charging a surface of the photoconductor 1Y to a predetermined potential; an exposure device 3 (an example of the electrostatic charge image forming unit) for forming an electrostatic charge image by exposing the charged surface with the laser beam 3Y based on an image signal subjected to color separation; a developing device 4Y (an example of the developing unit) for developing the electrostatic charge image by supplying a charged toner to the electrostatic charge image; a primary transfer roller 5Y (an example of the primary transfer unit) for transferring the developed toner image onto the intermediate transfer belt 20; and the photoconductor cleaning device 6Y (an example of the cleaning unit) for removing the toner remaining on the surface of the photoconductor 1Y after the primary transfer.

The primary transfer roller 5Y is disposed inside the intermediate transfer belt 20 and is provided at a position facing the photoconductor 1Y. A bias power source (not illustrated) for applying a primary transfer bias is connected to each of the primary transfer rollers 5Y, 5M, 5C, and 5K. Each bias power source can change a transfer bias applied to each primary transfer roller under the control of a controlling unit (not illustrated).

Hereinafter, an operation of forming a yellow image in the first unit 10Y will be described.

First, prior to the operation, the surface of the photoconductor 1Y is charged to a potential of −600 V to −800 V by using the charging roller 2Y.

The photoconductor 1Y is formed by laminating a photoconductive layer on a conductive substrate (such as having volume resistivity at 20° C. of $1\times10^{-6}$ Ωcm or less). The photoconductive layer generally has high resistance (resistance of general resin), but has a property that when irradiated with the laser beam 3Y, specific resistance of the portion irradiated with the laser beam changes. Therefore, the laser beam 3Y is output to the charged surface of the photoconductor 1Y via the exposure device 3 according to yellow image data sent from the controller (not illustrated). The photoconductive layer on the surface of the photoconductor 1Y is irradiated with the laser beam 3Y, and accordingly, an electrostatic charge image having a yellow image pattern is formed on the surface of the photoconductor 1Y.

The electrostatic charge image is an image formed on the surface of the photoconductor 1Y by charging, and is a so-called negative latent image formed by lowering the specific resistance of the portion of the photoconductive layer irradiated with the laser beam 3Y to flow charges charged on the surface of the photoconductor 1Y and by, on the other hand, leaving charges of a portion not irradiated with the laser beam 3Y.

The electrostatic charge image formed on the photoconductor 1Y rotates to a predetermined developing position as the photoconductor 1Y travels. Then, at this developing position, the electrostatic charge image on the photoconductor 1Y is visualized (developed) as a toner image by the developing device 4Y.

In the developing device 4Y, for example, an electrostatic charge image developer containing at least a yellow toner and a carrier is stored. The yellow toner is frictionally charged by being stirred in the developing device 4Y, and has a charge of the same polarity (negative) as the charge charged on the photoconductor 1Y and is carried on a developer roller (an example of a developer carrier). Then, when the surface of the photoconductor 1Y passes through the developing device 4Y, the yellow toner electrostatically adheres to a discharged latent image portion on the surface of the photoconductor 1Y, and the latent image is developed by the yellow toner. The photoconductor 1Y on which the yellow toner image is formed continuously travels at a predetermined speed, and the toner image developed on the photoconductor 1Y is conveyed to a predetermined primary transfer position.

When the yellow toner image on the photoconductor 1Y is conveyed to the primary transfer position, a primary transfer bias is applied to the primary transfer roller 5Y, an electrostatic force from the photoconductor 1Y to the primary transfer roller 5Y acts on the toner image, and the toner image on the photoconductor 1Y is transferred onto the intermediate transfer belt 20. The transfer bias applied at this time has a polarity (+) opposite to the polarity (−) of the toner, and is controlled to +10 μA by the controller (not illustrated), for example, in the first unit 10Y.

On the other hand, the toner remaining on the photoconductor 1Y is removed and collected by the photoconductor cleaning device 6Y.

The primary transfer bias applied to the primary transfer rollers 5M, 5C, and 5K at and after the second unit 10M is also controlled in the same manner as in the first unit.

In this way, the intermediate transfer belt 20 onto which the yellow toner image is transferred by the first unit 10Y is sequentially conveyed through the second to fourth units 10M, 10C, and 10K, and the toner images of the respective colors are superimposed and transferred in a multiple manner.

The intermediate transfer belt 20 onto which the toner images of four colors are transferred in a multiple manner through the first to fourth units arrives at a secondary transfer unit including the intermediate transfer belt 20, the support roller 24 in contact with the inner surface of the intermediate transfer belt, and a secondary transfer roller 26 (an example of the secondary transfer unit) disposed on the image carrying surface side of the intermediate transfer belt 20. On the other hand, recording paper P (an example of the recording medium) is fed through a supply mechanism into a gap where the secondary transfer roller 26 and the intermediate transfer belt 20 are in contact with each other at a predetermined timing, and a secondary transfer bias is applied to the support roller 24. The transfer bias applied at this time has the same polarity (−) as the toner polarity (−). The electrostatic force from the intermediate transfer belt 20 to the recording paper P acts on the toner image, and the toner image on the intermediate transfer belt 20 is transferred onto the recording paper P. The secondary transfer bias at this time is determined according to the resistance detected by a resistance detection unit (not illustrated) for detecting the resistance of the secondary transfer unit, and is voltage controlled.

Thereafter, the recording paper P is sent to a pressure contact portion (so-called nip portion) of a pair of fixing rollers in a fixing device 28 (an example of the fixing unit), the toner image is fixed to the recording paper P, and a fixed image is formed.

Examples of the recording paper P onto which the toner image is transferred include plain paper used in electrophotographic copiers and printers. As the recording medium, in addition to the recording paper P, an OHP sheet or the like may be used.

In order to further improve the smoothness of the image surface after fixing, the surface of the recording paper P is also preferably smooth. For example, coated paper obtained by coating the surface of plain paper with a resin or the like, art paper for printing, or the like is preferably used.

The recording paper P on which the fixing of the color image is completed is conveyed out toward a discharge unit, and a series of color image forming operations is completed.

<Process Cartridge and Toner Cartridge>

The process cartridge according to the present exemplary embodiment will be described.

The process cartridge according to the present exemplary embodiment is a process cartridge which includes a developing unit that stores the electrostatic charge image developer according to the present exemplary embodiment and develops, as a toner image, the electrostatic charge image formed on the surface of the image carrier by using the electrostatic charge image developer, and which is attached to and detached from the image forming apparatus.

The process cartridge according to the present exemplary embodiment is not limited to the above configuration and may be configured to include a developing unit and, if necessary, at least one selected from other units such as an image carrier, a charging unit, an electrostatic charge image forming unit, and a transfer unit.

Hereinafter an example of the process cartridge according to the present exemplary embodiment will be illustrated, but the process cartridge is not limited thereto, Main parts illustrated in the drawings will be described, and description of the other parts will be omitted.

Figure 2:
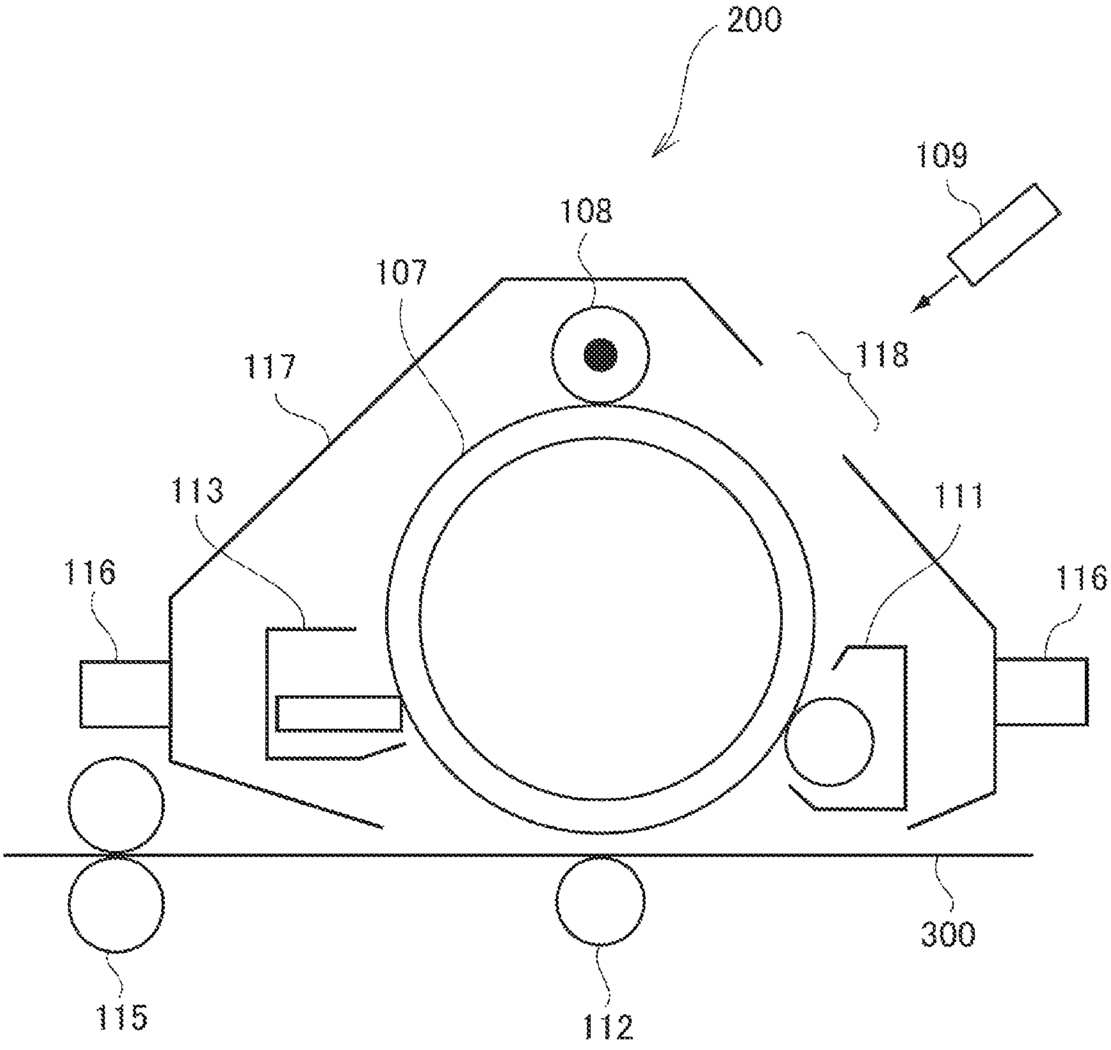
FIG. 2 is a schematic configuration diagram illustrating an example of a process cartridge according to the present exemplary embodiment.

FIG. 2 is a schematic configuration diagram illustrating the process cartridge according to the present exemplary embodiment.

A process cartridge 200 illustrated in FIG. 2 is configured as a cartridge by, for example, integrally combining and holding a photoconductor 107 (an example of the image carrier), a charging roller 108 (an example of the charging unit) provided around the photoconductor 107, a developing device 11 (an example of the developing unit), and a photoconductor cleaning device 113 (an example of the cleaning unit) by a housing 117 provided with a mounting rail 116 and an opening 118 for exposure.

In FIG. 2, 109 denotes an exposure device (an example of the electrostatic charge image forming unit), 112 denotes a transfer device (an example of the transfer unit), 115 denotes a fixing device (an example of the fixing unit), and 300 denotes recording paper (an example of the recording medium).

Next, the toner cartridge according to the present exemplary embodiment will be described.

The toner cartridge according to the present exemplary embodiment is a toner cartridge that stores the toner according to the present exemplary embodiment and is attached to and detached from the image forming apparatus. The toner cartridge stores a toner for replenishment to be supplied to the developing unit provided in the image forming apparatus.

The image forming apparatus illustrated in FIG. 1 is an image forming apparatus having a configuration in which the toner cartridges 8Y, 8M, 8C, and 8K are attached and detached, and the developing devices 4Y, 4M, 4C, and 4K are connected to toner cartridges corresponding to the respective developing devices (colors) by toner supply pipes (not illustrated). When the amount of the toner stored in the toner cartridge decreases, the toner cartridge is replaced.

EXAMPLE

Hereinafter, although Examples will be described, the present invention is not limited to Examples at all. In the following description, all "parts" and "%" are based on mass unless otherwise specified.

<Synthesis of Amorphous Polyester Resin (A)>

Terephthalic acid: 68 parts
Fumaric acid: 32 parts
Ethylene glycol: 42 parts
1,5-pentanediol: 47 parts The above materials are put into a flask equipped with a stirrer, a nitrogen inlet tube, a temperature sensor, and a rectifying column, the temperature is raised to 220° C. over 1 hour under a nitrogen gas stream, and 1 part of titanium tetraethoxide is added to 100 parts of the total of the above materials. The temperature is raised to 240° C. over 0.5 hours while distilling off produced water, and after continuing a dehydration condensation reaction at 240° C. for 1 hour, a reaction product is cooled. In this way, an amorphous polyester resin (A) having a weight average molecular weight of 97000 and a glass transition temperature of 60° C. is obtained.

<Preparation of Amorphous Polyester Resin Particle Dispersion Liquid (A1)>

40 parts of ethyl acetate and 25 parts of 2-butanol are put into a vessel equipped with a temperature control unit and a nitrogen substitution unit to prepare a mixed solvent, then 100 parts of the amorphous polyester resin (A) is gradually added and dissolved, and a 10% ammonia aqueous solution (corresponding to 3 times the acid value of the resin in terms of molar ratio) is added thereto, followed by stirring for 30 minutes. Next, an inside of the vessel is replaced with dry nitrogen, the temperature is maintained at 40° C., and 400 parts of ion-exchanged water is added dropwise while stirring a mixed solution to perform emulsification. After completion of the dropwise addition, a temperature of an emulsion is returned to 25° C. to obtain a resin particle dispersion liquid in which resin particles having a volume average particle diameter of 195 nm are dispersed. Ion exchanged water is added to the resin particle dispersion liquid to adjust a solid content to 20%, thereby obtaining an amorphous polyester resin particle dispersion liquid (A1).

<Preparation of Cyan Colorant-Containing Amorphous Polyester Resin Particle Dispersion Liquid (C1)>

250 parts of the amorphous polyester resin (A) and 50 parts of C.I. Pigment Blue 15:3 (phthalocyanine pigment, Cyanine Blue 4937, manufactured by Dainichiseika Color & Chemicals Mfg. Co., Ltd.) are put into a Henschel mixer and mixed at a screw rotation speed of 600 rpm for 120 seconds to obtain a raw material (A). 200 parts of the raw material (A) and 0.2 parts of a 50% sodium hydroxide aqueous solution are added into a raw material inlet of a twin-screw extruder (TEM-58SS, manufactured by Shibaura Machine Co., Ltd.), 40 parts of an anionic surfactant (Tayca Power, manufactured by Tayca Corporation, solid content: 12%, sodium dodecylbenzenesulfonate) is added from a fourth barrel of the twin-screw extruder, and the mixture is kneaded at each barrel set temperature of 95° C. and a screw rotation speed of 240 rpm. 150 parts of ion-exchanged water having a temperature of 95° C. is added from a fifth barrel of the twin-screw extruder, 150 parts by mass of the ion-exchanged water having a temperature of 95° C. is added from a seventh barrel of the twin-screw extruder, 15 parts of the ion-exchanged water having a temperature of 95° C. is added from a ninth barrel of the twin-screw extruder, and each mixture is kneaded at an average supply amount of the raw material (A) of 200 kg/h to obtain a resin particle dispersion liquid in which resin particles having a volume average particle diameter of 180 nm are dispersed. Ion-exchanged water is added to the resin particle dispersion liquid to adjust the solid content amount to 20%, thereby obtaining cyan colorant-containing (C.I. Pigment Blue 15:3) amorphous polyester resin particle dispersion liquid (C1).

<Preparation of Magenta Colorant-Containing Amorphous Polyester Resin Particle Dispersion Liquid (M1)>

Magenta colorant-containing (C.I. Pigment Red 269) amorphous polyester resin particle dispersion liquid (M1) is obtained by the same method as that of the cyan colorant-containing (C.I. Pigment Blue 15:3) amorphous polyester resin particle dispersion liquid (C1) except that the colorant is changed from C.I. Pigment Blue 15:3 to C.I. Pigment Red 269 (Quinacridone pigment, SYMULER FAST RED 1022, manufactured by DIC Corporation).

<Preparation of Yellow Colorant-Containing Amorphous Polyester Resin Particle Dispersion Liquid (Y1)>

Yellow colorant (C.I. Pigment Yellow 74)-containing amorphous polyester resin particle dispersion liquid (Y1) is obtained by the same method as that of the cyan colorant (C.I. Pigment Blue 15:3)-containing amorphous polyester resin particle dispersion liquid (C1) except that the colorant is changed from C.I. Pigment Blue 15:3 to C.I. Pigment Yellow 74 (Monoazo pigment, Seikafast Yellow 2054, manufactured by Dainichiseika Color & Chemicals Mfg. Co., Ltd.).

<Preparation of Black Colorant-Containing Amorphous Polyester Resin Particle Dispersion Liquid (K1)>

Black colorant (carbon black)-containing amorphous polyester resin particle dispersion liquid (K1) is obtained by the same method as that of the cyan colorant (C.I. Pigment Blue 15:3)-containing amorphous polyester resin particle dispersion liquid (C1) except that the colorant is changed from C.I. Pigment Blue 15:3 to carbon black (Regal 330, manufactured by Cabot Corporation).

<Preparation of Crystalline Polyester Resin Particle Dispersion Liquid (B1)>

1,10-decanedicarboxylic acid: 260 parts
1,6-hexanediol: 167 parts
Dibutyltin oxide (catalyst): 0.3 parts The above materials are put into a heated and dried three-neck flask, air in the three-neck flask is replaced with nitrogen gas to make an inert atmosphere, and stirring and refluxing are performed at 180° C. for 5 hours by mechanical stirring. Subsequently, the temperature is gradually increased to 230° C. under a reduced pressure, the mixture is stirred for 2 hours, and when the mixture is in a viscous state, air cooling is performed to stop the reaction. In this way, a crystalline polyester resin having a weight average molecular weight of 12500 and a melting temperature of 73° C. is obtained. 90 parts of the crystalline polyester resin, 1.8 parts of an anionic surfactant (Tayca Power, manufactured by Tayca Corporation, solid content: 12%, sodium dodecylbenzenesulfonate), and 210 parts of ion-exchanged water are mixed, heated to 120° C., dispersed by using a homogenizer (Ultra Turrax T50, manufactured by IKA-Werke), and then subjected to a dispersion treatment for 1 hour by using a pressure-discharge-type Gaulin homogenizer to obtain a resin particle dispersion liquid in which resin particles having a volume average particle diameter of 195 nm are dispersed. Ion-exchanged water is added to the resin particle dispersion liquid to adjust a solid content to 20%, thereby obtaining a crystalline polyester resin particle dispersion liquid (B1).

(Preparation of Crystalline Polyester Resin Particle Dispersion Liquid (B2))

Terephthatic acid: 235 parts 1, 4-butenediol: 123 parts

Dibutyltin oxide (catalyst): 0.3 parts

The above components are put into a heated and dried three-neck flask, then air in the vessel is brought into an inert atmosphere with nitrogen gas by a decompression operation, and stirring and refluxing are performed at 175° C. for 4 hours by mechanical stirring. Thereafter, the temperature is gradually increased to 230° C. under a reduced pressure, the mixture is stirred for 2 hours, and when the mixture is in a viscous state, air cooling is performed to stop the reaction. In molecular weight measurement (in terms of polystyrene), a weight average molecular weight (Mw) of the obtained "crystalline polyester resin (B2)" is 12700, and a melting temperature is 69° C. 90 parts of the obtained resin, 1.5 parts of an anionic surfactant (Tayca Power, manufactured by Tayca Corporation, solid content: 12%, sodium dodecylbenzenesulfonate), and 200 parts of ion-exchanged water are mixed, heated to 120° C., dispersed by using the Ultra Turrax T50 manufactured by IKA-Werke, and then subjected to a dispersion treatment for 1 hour by using the pressure-discharge-type Gaulin homogenizer to obtain a crystalline polyester resin particle dispersion liquid (B2) in which resin particles having a volume average particle diameter of 195 nm are dispersed and a solid content amount is 20 parts by mass.

<Preparation of Styrene Acrylic Resin Particle Dispersion Liquid (S1)>

Styrene: 375 parts n-butyl acrylate: 25 parts

Acrylic acid: 2 parts

Dodecanthiol: 24 parts

Carbon tetrabromide: 4 parts

A mixture obtained by mixing and dissolving the above materials is dispersed and emulsified in a flask in a surfactant solution obtained by dissolving 6 parts of a nonionic surfactant (Nonipole 400, manufactured by Sanyo Chemical Industries, Ltd.) and 10 parts of an anionic surfactant (Tayca Power, manufactured by Tayca Corporation, solid content: 12%, sodium dodecylbenzenesulfonate) in 550 parts of ion-exchanged water. Next, an aqueous solution in which 4 parts of ammonium persulfate is dissolved in 50 parts of ion-exchanged water is added into the flask over 20 minutes while stirring the inside of the flask. Subsequently, after performing nitrogen substitution, the flask is heated in an oil bath until the temperature of the content reaches 70° C. while stirring the inside of the flask, and the temperature is maintained at 70° C. for 5 hours to continue emulsion polymerization. In this way, a resin particle dispersion liquid in which resin particles having a volume average particle diameter of 150 nm are dispersed is obtained. Ion-exchanged water is added to the resin particle dispersion liquid to adjust a solid content to 20%, thereby obtaining the styrene acrylic resin particle dispersion liquid (S1).

<Preparation of Hybrid Resin (Amorphous Resin Having Amorphous Polyester Resin Segment and Styrene Acrylic Resin Segment) Particle Dispersion Liquid (SPE1)

An inside of a four-necked flask equipped with the nitrogen inlet tube, a dehydration tube, a stirrer, and a thermocouple is purged with nitrogen, 5,670 parts of polyoxypropylene (2.2)-2,2-bis (4-hydroxyphenyl) propane, 585 parts of polyoxyethylene (2.0)-2,2-bis (4-hydroxyphenyl) propane, 2,450 parts of terephthalic acid, and 44 parts of di (2-ethylhexanoic acid) tin (II) are added thereto, the temperature is raised to 235° C. and maintained for 5 hours while stirring in a nitrogen atmosphere, and then a pressure in the flask is lowered and maintained at 8.0 kPa for 1 hour. After returning to an atmospheric pressure, the mixture is cooled to 190° C., 42 parts of fumaric acid and 207 parts of trimellitic acid are added thereto, the mixture is maintained at a temperature of 190° C. for 2 hours, and then the temperature is raised to 210° C. over 2 hours. The pressure in the flask is further reduced and maintained at 8.0 kPa for 4 hours to obtain an amorphous polyester resin A (polyester segment).

Next, 800 parts of the amorphous polyester resin A is added to a four-necked flask equipped with a condenser, a stirrer, and a thermocouple, and the mixture is stirred at a stirring speed of 200 rpm in the nitrogen atmosphere. Thereafter, as addition polymerizable monomers, 40 parts of styrene, 142 parts of ethyl acrylate, 16 parts of acrylic acid, 2 parts of 1,10-decanediol diacrylate, and 1000 parts of toluene are added and further mixed for 30 minutes.

Further, 6 parts of polyoxyethylene alkyl ether (nonionic surfactant, trade name: EMULGEN 430, manufactured by Kao Corporation), 40 parts of a 15% aqueous solution of sodium dodecylbenzenesulfonate (anionic surfactant, trade name: NEOPELEX G-15, manufactured by Kao Corporation), and 233 parts of 5% potassium hydroxide are added, the mixture is heated to 95° C. and melted while stirring, and mixed at 95° C. for 2 hours to obtain a resin mixture solution.

Next, 1145 parts of deionized water is added dropwise to the resin mixture solution at a rate of 6 parts/min while stirring to obtain an emulsion. Next, the obtained emulsion is cooled to 25° C. and passed through a 200-mesh wire mesh, and the deionized water is added to adjust the solid content to 30%, thereby obtaining a hybrid resin particle dispersion liquid (SPE1).

A content of a constituent unit derived from styrene in the synthesized hybrid resin is 4 mass % with respect to a total mass of the hybrid resin.

[Preparation of Release Agent Particle Dispersion Liquid (W1)]

Ester wax (WEP-8, melting temperature: 79° C., manufactured by NOF Corporation): 100 parts Anionic surfactant (Tayca Power, manufactured by Tayca Corporation, sodium dodecylbenzenesulfonate): 1 part Ion-exchanged water: 350 parts The above materials are mixed, heated to 100° C., and dispersed using a homogenizer (Ultra Turrax T50, manufactured by IKA-Werke), and then a dispersion treatment is performed using a pressure discharge Gaulin homogenizer, to obtain a release agent particle dispersion liquid in which release agent particles having a volume average particle diameter of 220 nm are dispersed. Ion-exchanged water is added to the release agent particle dispersion liquid to adjust the solid content amount to 20% to obtain a release agent particle dispersion liquid (W1).

<Preparation of Toner Particles>

<Preparation of Toner Particles (C1/M1/Y1/K1) of Various Colors>

Ion-exchanged water: 200 parts

Cyan colorant-containing amorphous polyester resin particle dispersion liquid (C1): 145 parts Styrene acrylic resin particle dispersion liquid (S1): 30 parts Release agent particle dispersion liquid (W1): 10 parts The above materials are put into a round stainless steel flask, and 0.1N (0.1 mol/L) nitric acid is added thereto to adjust the pH to 3.5, and then an aqueous solution of magnesium chloride in which 6 parts of magnesium chloride is dissolved in 30 parts of ion-exchanged water is added. The mixture is dispersed at 30° C. by using the homogenizer (Ultra Turrax T50, manufactured by IKA-Werke), then heated to 45° C. in an oil bath for heating, and held until the volume average particle diameter becomes 4.5 μm.

Next, 30 parts of the amorphous polyester resin particle dispersion liquid (A1) and 15 parts of the crystalline polyester resin particle dispersion liquid (B1) are added and held for 30 minutes. These two dispersion liquids are added every 30 minutes a total of 4 times.

Next, 40 parts of the amorphous polyester resin particle dispersion liquid (A1) is added, and the pH is adjusted to 9.0 by using a 1N sodium hydroxide aqueous solution.

Next, while continuing stirring, the temperature is increased to 85° C. at a temperature rising rate of 0.05° C./min, held at 85° C. for 3 hours, and then cooled to 30° C. at a temperature drop rate of 15° C./min (first cooling). Next, the mixture is heated to 85° C. at a temperature rising rate of 0.2° C./min (reheated), held for 30 minutes, and then cooled to 30° C. at a temperature drop rate of 0.5° C./min (second cooling).

Next, the solid content is separated by filtration, cleaned with ion-exchanged water, and dried to obtain cyan toner particles (C1) having a volume average particle diameter of 5.8 μm.

Magenta toner particles (M1), yellow toner particles (Y1), and black toner particles (K1) are obtained, except that the cyan colorant-containing amorphous polyester resin particle dispersion liquid (C1) in the preparation of the cyan toner particles (C1) is changed to the magenta colorant-containing amorphous polyester resin particle dispersion liquid (M1), the yellow colorant-containing amorphous polyester resin particle dispersion liquid (Y1), and the black colorant-containing amorphous polyester resin particle dispersion liquid (K1).

<Preparation of Toner Particles (C2/M2/Y2/K2) of Various Colors>

Toner particles (C2/M2/Y2/K2) of various colors are obtained by the same method as that of the preparation of the cyan toner particles (C1), except that in the preparation of the cyan toner particles (C1), the following points are changed.

An addition amount of magnesium chloride in the preparation of the toner particles is changed from 6 parts to 4 parts.

In the preparation of the toner particles, 2 parts of ammonium chloride is added as a Cl element supply source.

<Preparation of Toner Particles (C3/M3/Y3/K3) of Various Colors>

Toner particles (C3/M3/Y3/K3) of various colors are obtained by the same method as that of the preparation of the cyan toner particles (C1), except that in the preparation of the cyan toner particles (C1), the following points are changed.

The addition amount of magnesium chloride in the preparation of the toner particles is changed from 6 parts to 20 parts.

<Preparation of Toner Particles (C4/M4/Y4/K4) of Various Colors>

Toner particles (C4/M4/Y4/K4) of various colors are obtained by the same method as that of the preparation of the cyan toner particles (C1), except that in the preparation of the cyan toner particles (C1), the following points are changed.

In the preparation of the toner particles, 6 parts of magnesium bromide is added instead of 6 parts of magnesium chloride.

In the preparation of the toner particles, 2 parts of ammonium chloride is added as a Cl element supply source.

<Preparation of Toner Particles (C5/M5/Y5/K5) of Various Colors>

Toner particles (C5/M5/Y5/K5) of various colors are obtained by the same method as that of the preparation of the cyan toner particles (C1), except that in the preparation of the cyan toner particles (C1), the following points are changed.

In the preparation of the toner particles, 50 parts of ammonium chloride is added as a Cl element supply source.

<Preparation of Toner Particles (C6/M6/Y6/K6) of Various Colors>

Toner particles (C6/M6/Y6/K6) of various colors are obtained by the same method as that of the preparation of the cyan toner particles (C1), except that in the preparation of the cyan toner particles (C1), the following points are changed.

An addition amount of magnesium chloride in the preparation of the toner particles is changed from 6 parts to 2 parts.

In the preparation of the toner particles, 6 parts of ammonium chloride is added as the Cl element supply source.

<Preparation of Toner Particles (C7/M7/Y7/K7) of Various Colors>

Toner particles (C7/M7/Y7/K7) of various colors are obtained by the same method as that of the preparation of the cyan toner particles (C1), except that in the preparation of the cyan toner particles (C1), the following points are changed.

The addition amount of magnesium chloride in the preparation of the toner particles is changed from 6 parts to 30 parts.

<Preparation of Toner Particles (C8/M8/Y8/K8) of Various Colors>

Toner particles (C8/M8/Y8/K8) of various colors are obtained by the same method as that of the preparation of the cyan toner particles (C1), except that in the preparation of the cyan toner particles (C1), the following points are changed.

In the preparation of the toner particles, 6 parts of magnesium bromide is added instead of 6 parts of magnesium chloride.

<Preparation of Toner Particles (C9/M9/Y9/K9) of Various Colors>

Toner particles (C9/M9/Y9/K9) of various colors are obtained by the same method as in the preparation of the toner particles (C1/M1/Y1/K1) of various colors except that the addition of 6 parts of magnesium chloride is changed to the addition of 2 parts of calcium chloride in the preparation of toner particles (C1/M1/Y1/K1) of various colors.

<Preparation of Toner Particles (C10/M10/Y10/K10) of Various Colors>

Toner particles (C10/M10/Y10/K10) of various colors are obtained by the same method as that of the preparation of the cyan toner particles (C1), except that in the preparation of the cyan toner particles (C1), the following points are changed.

In the preparation of the toner particles, 8 parts of ammonium chloride is added as the Cl element supply source.

<Preparation of Toner Particles (C11/M11/Y11/K11) of Various Colors>

Toner particles (C11/M11/Y11/K11) of various colors are obtained by the same method as that of the preparation of the cyan toner particles (C1), except that in the preparation of the cyan toner particles (C1), the following points are changed.

In the preparation of the toner particles, 1.5 parts of ammonium chloride is added as the Cl element supply source.

<Preparation of Toner Particles (C12/M12/Y12/K12) of Various Colors>

Toner particles (C20/M20/Y20/K20) of various colors are obtained by the same method as that of the preparation of the toner particles (C1/M1/Y1/K1) of various colors except that the crystalline polyester resin particle dispersion liquid (B1) is not added in preparation of toner particles (C1/M1/Y1/K1) of various colors.

<Preparation of Toner Particles (C13/M13/Y13/K13) of Various Colors>

Toner particles (C2/M21/Y21/K21) of various colors are obtained by the same method as that of the preparation of the toner particles (C1/M1/Y1/K1) of various colors except that the crystalline polyester resin particle dispersion liquid (B1) is changed to the crystalline polyester resin particle dispersion liquid (B2) in the preparation of the toner particles (C1/M1/Y1/K1) of various colors.

<Preparation of Toner Particles (C14/M14/Y14/K14) of Various Colors>

A cyan toner particle (C14) is obtained by the same method as that of the cyan toner particle (C1) except that the amorphous polyester resin particle dispersion liquid (A1) is changed to a hybrid resin (amorphous resin having an amorphous polyester resin segment and a styrene acrylic resin segment) particle dispersion liquid (SPE1). Magenta toner particles (M14), yellow toner particles (Y14), and black toner particles (K14) are obtained by the same method as that in the cyan toner particles (C14) except that the cyan colorant-containing amorphous polyester resin particle dispersion liquid (C1) is changed to the magenta colorant-containing amorphous polyester resin particle dispersion liquid (M1), the yellow colorant-containing amorphous polyester resin particle dispersion liquid (Y1), and the black colorant-containing amorphous polyester resin particle dispersion liquid (K1).

[Preparation of Silica Particles]

Preparing Step [Preparation of Alkali Catalyst Solution (1)]

200 parts of methanol and 36 parts of 10% ammonia water are put into in a glass reaction vessel equipped with a stirring blade, a dropping nozzle, and a thermometer, and a mixture is stirred and mixed to obtain an alkali catalyst solution (1). An ammonia content of the alkali catalyst solution (1) at this time is 0.73 mol/L.

Particle Generating Step [Preparation of Silica Particle Suspension (1)]

(First Supplying Step)

A temperature of the alkali catalyst solution (1) is adjusted to 30° C., and the alkali catalyst solution (1) is purged with nitrogen. Thereafter, while the alkali catalyst solution (1) is stirred at 120 rpm, tetramethoxysilane (TMOS) and ammonia water having a concentration of 3.7% are added dropwise thereto at flow rates of 4 parts/min and 2.4 parts/min, respectively.

After a lapse of 1.5 minutes from a start of the supply of the tetramethoxysilane and the ammonia water, the supply of the tetramethoxysilane and the ammonia water is stopped at the same time. A supply amount of the tetramethoxysilane at a time when the supply of the tetramethoxysilane and the ammonia water is stopped is 0.0063 mol/mol with respect to the number of moles of the alcohol added to the reaction vessel in the preparing step.

(Aging Step)

After the supply of tetramethoxysilane and ammonia water is stopped, stirring is performed for 1 minute.

(Second Supplying Step)

After completion of the aging step, the supply of tetramethoxysilane and ammonia water is restarted. Flow rates of the tetramethoxysilane and the ammonia water are set to 4 parts/min and 2.4 parts/min, respectively.

Addition amounts of the tetramethoxysilane and the 3.7% ammonia water in all the steps including the first supplying step and the second supplying step are 90 parts of the tetramethoxysilane and 54 parts of the 3.7% ammonia water.

After completion of dropwise addition of the tetramethoxysilane and 3.7% ammonia water, a silica particle suspension (1) is obtained.

(Removal of Solvent and Drying)

The solvent of the obtained silica particle suspension (1) is heated and distilled to remove 150 parts of the solvent. Thereafter, 150 parts of pure water is added thereto, and the drying is performed by a freeze dryer to obtain silica particles (1) before the hydrophobization treatment.

—Hydrophobization Treatment of Silica Particles—

7 parts of hexamethyldisilazane is added to 35 g of the silica particles (1) before the hydrophobization treatment, and the mixture is reacted at 150° C. for 2 hours to obtain silica particles (silica particles (1)) whose surfaces have been subjected to the hydrophobization treatment.

When the volume average particle diameter and the circularity of the obtained silica particles (1) are measured, the volume average particle diameter is 170 nm and the circularity is 0.73.

The volume average particle diameter of the silica primary particles of the silica particles (1) is 60 nm.

(Silica Particles (2))

Silica particles (2) are obtained by the same method as that of the silica particles (1) except that the supply time of the tetramethoxysilane and the ammonia water is changed from 1.5 minutes to 0.6 minutes in the preparation of the silica particles (1).

(Silica Particles (3))

Silica particles (3) are obtained by the same method as that of the silica particles (1) except that the supply time of the tetramethoxysilane and the ammonia water is changed from 1.5 minutes to 2.0 minutes in the preparation of the silica particles (1).

(Silica Particles (4))

Silica particles (4) are obtained by the same method as that of the silica particles (1) except that an aging time is changed from 1 minute to 0.2 minutes in the preparation of the silica particles (1).

(Silica Particles (5))

Silica particles (5) are obtained by the same method as that of the silica particles (1) except that the aging time is changed from 1 minute to 10 minutes in the preparation of the silica particles (1).

(Silica Particles (6))

Silica particles (6) are obtained by the same method as that of the silica particles (1) except that the supply time of the tetramethoxysilane and the ammonia water is changed from 1.5 minutes to 0.3 minutes in the preparation of the silica particles (1).

(Silica Particles (7))

Silica particles (7) are obtained by the same method as that of the silica particles (1) except that the supply time of the tetramethoxysilane and the ammonia water is changed from 1.5 minutes to 3.0 minutes and the aging time is changed from 1 minute to 10 minutes in the preparation of the silica particles (1).

(Silica Particles (8))

Silica particles (8) are obtained by the same method as that of the silica particles (1) except that the aging step is not performed in the preparation of the silica particles (1).

(Silica Particles (9))

Silica particles (9) are obtained by the same method as that of the silica particles (1) except that the temperature of the alkali catalyst solution (1) is adjusted to 50° C., the supply time of the tetramethoxysilane and the ammonia water is changed from 1.5 minutes to 2.2 minutes, and the aging time is changed from 1 minute to 10 minutes in the preparation of the silica particles (1).

(Silica Particles (10))

Silica particles (10) are obtained by the same method as that of the silica particles (1) except that the temperature of the alkali catalyst solution (1) is adjusted to 70° C., the supply time of the tetramethoxysilane and the ammonia water is changed from 1.5 minutes to 3.0 minutes, and the aging time is changed from 1 minute to 10 minutes in the preparation of the silica particles (1).

(Silica Particles (11))

Silica particles (11) are obtained by the same method as that of the silica particles (1) except that the temperature of the alkali catalyst solution (1) is adjusted to 50° C. and the aging time is changed from 1 minute to 20 minutes in the preparation of the silica particles (1).

(Silica Particles (12))

Silica particles (12) are obtained by the same method as that of the silica particles (1) except that the temperature of the alkali catalyst solution (1) is adjusted to 60° C. and the aging time is changed from 1 minute to 20 minutes in the preparation of the silica particles (1).

(Silica Particles (13))

Silica particles (13) are obtained by the same method as that of the silica particles (1) except that the temperature of the alkali catalyst solution (1) is adjusted to 10° C. and the supply time of the tetramethoxysilane and the ammonia water is changed from 1.5 minutes to 1.2 minutes in the preparation of the silica particles (1).

(Silica Particles (14))

Silica particles (14) are obtained by the same method as that of the silica particles (1) except that the temperature of the alkali catalyst solution (1) is adjusted to 0° C. and the supply time of the tetramethoxysilane and the ammonia water is changed from 1.5 minutes to 1.2 minutes in the preparation of the silica particles (1).

[Preparation of Carrier]

After 500 parts of spherical magnetite powder particles (having a volume average particle diameter of 0.55 μm) are stirred in a Henschel mixer. 5 parts of a titanate coupling agent is added thereto, the temperature is raised to 100° C., and the mixture is stirred for 30 minutes. Next, 6.25 parts of phenol, 9.25 parts of 35% formalin, 500 parts of magnetite particles treated with a titanate coupling agent, 6.25 parts of 25% ammonia water, and 425 parts of water are put into a four-neck flask and stirred to react at 85° C. for 120 minutes while stirring. Subsequently the mixture is cooled to 25° C., 500 parts of water is added thereto, a supernatant liquid is removed, and precipitate is washed with water. The washed precipitate is dried by heating under a reduced pressure to obtain a carrier (CA) having an average particle diameter of 35 μm.

Example 1

[External Addition of External Additive]

100 parts of the cyan toner particles (C1), 1.0 part of the silica particles (1), and 1.5 parts by mass of hydrophobic silica (RY50 manufactured by Nippon Aerosil Co., Ltd., number average particle diameter 140 nm) are mixed, and mixed using a sample mill at a rotation speed of 10,000 rpm for 30 seconds. The mixture is sieved with a vibrating sieve having an opening of 45 μm to obtain a toner (C1). A volume average particle diameter of the toner (C1) is 5.8 μm.

[Mixing of Toner and Carrier]

The cyan toner (C1) and the carrier (CA) are put into a V blender at a ratio of toner (C1):carrier (CA)=5:95 (mass ratio) and stirred for 20 minutes to obtain a cyan developer (C1).

[Preparation of Various Developers]

Further, a magenta developer (M1), a yellow developer (Y1), and a black developer (K1) are obtained by the same method as that of the cyan developer (C1) except that the obtained respective toner particles are used instead of the cyan toner particles (C1).

A set of the obtained developers of the respective colors is used as a developer set of Example 1.

Examples 2 to 22 and Comparative Examples 1 to 7

A developer set of each example is obtained by the same method as that of Example 1 except that a type of the toner particles and a type of the external additive are changed as shown in Table 1.

[Measurement of Volume Average Particle Diameter of Toner Particles]

In the developer set of each Example, the volume average particle diameter of the toner particles in the cyan developer is measured according to the method described above. The results are shown in Table 1. The "volume average particle diameter" of the toner particles in the developer of another color is substantially the same as the "volume average particle diameter" of the toner particles in the cyan developer.

[Various Measurements on Silica Particles]

The volume average particle diameter, the circularity, and the aspect ratio of the silica particles are measured according to the methods described above. Further, when the silica particles are the aggregates of the silica primary particles, the volume average particle diameter of the silica primary particles (described as "primary particle diameter" in Table 1) is measured according to the method described above.

[Measurement of Net Intensity of Each Element]

In the developer set of each Example, the Net intensities of the following elements of the toner particles in the cyan developer are measured according to the method described above. Results thereof are shown in Table 2. The "Net intensity of each elements" of the toner particles in the developer of another color are substantially the same as the "Net intensity of each elements" of the toner particles in the cyan developer.

Net intensity $N_{Cl}$ of Cl element (denoted as "Cl ($N_{Cl}$)" in Table 2)

Total of a Net intensity $N_A$ of the alkali metal element and the alkaline earth metal element (denoted as "ALKALI ($N_A$)" in Table 2)

Net intensity $N_N$ of Na element (denoted as "Na ($N_N$)" in Table 2)

Net intensity $N_M$ of Mg element (denoted as "Mg ($N_M$)" in Table 2)

Net intensity $N_C$ of Ca element (denoted as "Ca ($N_C$)" in Table 2)

Total of a Net intensity $N_{A\text{-}NMC}$ of the alkali metal element and the alkaline earth metal element other than Na element, Mg element, and Ca element (denoted as "ALKALI-(Na+Mg+Ca) ($N_{A\text{-}NMC}$)" in Table 2)

<Image Density Unevenness Evaluation>

The developer set of each Example is stored in a developing device of a modified machine of DocuCentre Color 400 (manufactured by FUJIFILM Business Innovation Corp.). Using this modified machine, 10,000 sheets of four-color band chart images having an image density of 20% are output per day on A4 size J paper (manufactured by FUJIFILM Business Innovation Corp.) under an environment of 28.5° C. and 85% RH. A total of 20,000 sheets are output, and a transfer belt member is deteriorated. Next, in an environment of 28.5° C. and 85% RH, a test of outputting 10,000 sheets of a horizontal band chart image of 2×290 mm per day on A4 size paper (manufactured by FUJIFILM Business Innovation Corp.) is continuously performed for 10 days in total. Then, 10 solid images of red, blue, and green are printed on A4 size J paper (manufactured by FUJIFILM Business Innovation Corp.) in a horizontal band chart of 30×290 mm, and obtained images are confirmed. A region of 15 mm from each of a head and a tail in a process progress direction of the horizontal band chart toward a center of the horizontal band chart is set as a measurement target, and a density difference (ΔE) is confirmed, Evaluation criteria are as follows.

Evaluation Criteria

A: The density difference ΔE<1, and there is no problem in image quality by visual observation.

B: The density difference ΔE<3, and there is no problem in image quality by visual observation.

C: The density difference ΔE<4, and slight unevenness is observed in the image quality, but there is no problem in the image quality.

D: The density difference ΔE<5, and unevenness is observed in image quality.

E: The density difference ΔE<5, and clear unevenness is observed in an image portion.

Details of abbreviations in description of Table 1 are as follows.

1,10-DDA: 1,10-decanedicarboxylic acid 1,6-HDO: 1,6-hexanediol

TABLE 1

| | | Toner particle | | | Silica particle | | | | |
|---|---|---|---|---|---|---|---|---|---|
| | Developer Type | Type | Particle diameter (μm) | Crystalline resin (Type of polycarboxylic acid/type of polyhydric alcohol) | Type | Primary particle diameter (um) | Circularity | Particle diameter (nm) | Aspect ratio |
| Example 1 | Developer C1/M1/Y1/K1 | Toner particle C1/M1/Y1/K1 | 5.8 | 1,10-DDA/1,6-HDO | 1 | 60 | 0.73 | 170 | 1.8 |
| Example 2 | Developer C2/M2/Y2/K2 | Toner particle C1/M1/Y1/K1 | 5.8 | 1,10-DDA/1,6-HDO | 2 | 10 | 0.81 | 110 | 1.5 |
| Example 3 | Developer C3/M3/Y3/K3 | Toner particle C1/M1/Y1/K1 | 5.8 | 1,10-DDA/1,6-HDO | 3 | 90 | 0.70 | 290 | 1.6 |
| Example 4 | Developer C4/M4/Y4/K4 | Toner particle C1/M1/Y1/K1 | 5.8 | 1,10-DDA/1,6-HDO | 4 | 60 | 0.55 | 175 | 3.0 |
| Example 5 | Developer C5/M5/Y5/K5 | Toner particle C1/M1/Y1/K1 | 5.8 | 1,10-DDA/1,6-HDO | 5 | 60 | 0.88 | 165 | 1.5 |
| Example 6 | Developer C6/M6/Y6/K6 | Toner particle C2/M2/Y2/K2 | 5.8 | 1,10-DDA/1,6-HDO | 5 | 60 | 0.88 | 165 | 1.5 |
| Example 7 | Developer C7/M7/Y7/K7 | Toner particle C3/M3/Y3/K3 | 5.8 | 1,10-DDA/1,6-HDO | 1 | 60 | 0.73 | 170 | 2.0 |
| Example 8 | Developer C8/M8/Y8/K8 | Toner particle C4/M4/Y4/K4 | 5.8 | 1,10-DDA/1,6-HDO | 1 | 60 | 0.73 | 170 | 2.0 |
| Example 9 | Developer C9/M9/Y9/K9 | Toner particle C5/M5/Y5/K5 | 5.8 | 1,10-DDA/1,6-HDO | 1 | 60 | 0.73 | 170 | 2.0 |
| Example 10 | Developer C10/M10/Y10/K10 | Toner particle C8/M8/Y8/K8 | 5.8 | 1,10-DDA/1,6-HDO | 1 | 60 | 0.73 | 170 | 2.0 |
| Comparative example 1 | Developer CC1/MC1/YC1/KC1 | Toner particle C6/M6/Y6/K.6 | 5.8 | 1,10-DDA/1,6-HDO | 1 | 60 | 0.73 | 170 | 2.0 |
| Comparative example 2 | Developer CC2/MC2/YC2/KC2 | Toner particle C7/M7/Y7/K.7 | 5.8 | 1,10-DDA/1,6-HDO | 1 | 60 | 0.73 | 170 | 2.0 |
| Comparative example 3 | Developer CC3/MC3/YC3/KC3 | Toner particle C1/M1/Y1/K1 | 5.8 | 1,10-DDA/1,6-HDO | 6 | 5 | 0.71 | 100 | 2.2 |
| Comparative example 4 | Developer CC4/MC4/YC4/KC4 | Toner particle C1/M1/Y1/K1 | 5.8 | 1,10-DDA/1,6-HDO | 7 | 100 | 0.75 | 370 | 2.0 |
| Comparative example 5 | Developer CC5/MC5/YC5/KC5 | Toner particle C1/M1/Y1/K1 | 5.8 | 1,10-DDA/1,6-HDO | 8 | 160 | 0.95 | 163 | 1.1 |
| Comparative example 6 | Developer CC6/MC6/YC6/KC6 | Toner particle C1/M1/Y1/K1 | 5.8 | 1,10-DDA/1,6-HDO | 9 | 60 | 0.50 | 240 | 3.1 |
| Comparative example 7 | Developer CC7/MC7/YC7/KC7 | Toner particle C1/M1/Y1/K1 | 5.8 | 1,10-DDA/1,6-HDO | 10 | 90 | 0.55 | 310 | 3.3 |
| Example 11 | Developer C11/M11/Y11/K11 | Toner particle C1/M1/Y1/K1 | 5.8 | 1,10-DDA/1,6-HDO | 11 | 60 | 0.55 | 280 | 5.0 |
| Example 1 2 | Developer C12/M12/Y12/K12 | Toner particle C1/M1/Y1/K1 | 5.8 | 1,10-DDA/1,6-HDO | 12 | 60 | 0.55 | 290 | 5.1 |

TABLE 1-continued

| | | Toner particle | | | Silica particle | | | | |
|---|---|---|---|---|---|---|---|---|---|
| | Developer Type | Type | Particle diameter (μm) | Crystalline resin (Type of polycarboxylic acid/type of polyhydric alcohol) | Type | Primary particle diameter (um) | Circularity | Particle diameter (nm) | Aspect ratio |
| Example 13 | Developer C13/M13/Y13/K13 | Toner particle C1/M1/Y1/K1 | 5.8 | 1,10-DDA/1,6-HDO | 13 | 60 | 0.89 | 160 | 1.5 |
| Example 14 | Developer C14/M14/Y14/K14 | Toner particle C1/M1/Y1/K1 | 5.8 | 1,10-DDA/1,6-HDO | 14 | 60 | 0.88 | 165 | 1.4 |
| Example 15 | Developer C15/M15/Y15/K15 | Toner particle C1/M1/Y1/K1 | 5.8 | 1,10-DDA/1,6-HDO | 1 | 60 | 0.73 | 170 | 1.3 |
| Example 16 | Developer C16/M16/Y16/K16 | Toner particle C1/M1/Y1/K1 | 5.8 | 1,10-DDA/1,6-HDO | 1 | 60 | 0.73 | 170 | 5.6 |
| Example 17 | Developer C17/MI7/Y17/K17 | Toner particle C9/M9/Y9/K9 | 5.8 | 1,10-DDA/1,6-HDO | 1 | 60 | 0.73 | 170 | 1.8 |
| Example 18 | Developer C18/M18/Y18/K18 | Toner particle C10/M10/Y10/K10 | 5.8 | 1,10-DDA/1,6-HDO | 1 | 60 | 0.73 | 170 | 1.8 |
| Example 19 | Developer C19/M19/Y19/K19 | Toner particle C11/M11/Y11/K11 | 5.8 | 1,10-DDA/1,6-HDO | 1 | 60 | 0.73 | 170 | 1.8 |
| Example 20 | Developer C20/M20/Y20/K20 | Toner particle C12/M12/Y12/K12 | 5.8 | — | 1 | 60 | 0.73 | 170 | 1.8 |
| Example 21 | Developer C21/M21/Y21/K21 | Toner particle C13/M13/Y13/K13 | 5.8 | Terephthalic acid/ 1,4-butenediol | 1 | 60 | 0.73 | 170 | 1.8 |
| Example 22 | Developer C22/M22/Y22/K22 | Toner particle C14/M14/Y14/K14 | 5.8 | 1,10-DDA/1,6-HDO | 1 | 60 | 0.73 | 170 | 1.8 |

TABLE 2

| | Net intensity | | | | | | | |
|---|---|---|---|---|---|---|---|---|
| | ALKALI ($N_A$) | Na ($N_N$) | Mg ($N_M$) | Ca ($N_C$) | ALKALI-(Na + Mg + Ca) ($N_{A-NMC}$) | Cl ($N_{Cl}$) | $N_{Cl}/N_A$ | Image density unevenness |
| Example 1 | 0.29 | 0.03 | 0.26 | 0.00 | 0 | 0.15 | 0.517241 | A |
| Example 2 | 0.29 | 0.03 | 0.26 | 0.00 | 0 | 0.15 | 0.517241 | B |
| Example 3 | 0.29 | 0.03 | 0.26 | 0.00 | 0 | 0.15 | 0.517241 | B |
| Example 4 | 0.29 | 0.03 | 0.26 | 0.00 | 0 | 0.15 | 0.517241 | B |
| Example 5 | 0.29 | 0.03 | 0.26 | 0.00 | 0 | 0.15 | 0.517241 | B |
| Example 6 | 0.13 | 0.03 | 0.10 | 0.00 | 0 | 0.15 | 1.153846 | B |
| Example 7 | 1.13 | 0.03 | 1.10 | 0.00 | 0 | 0.15 | 0.132743 | B |
| Example 8 | 0.29 | 0.03 | 0.26 | 0.00 | 0 | 0.05 | 0.172414 | B |
| Example 9 | 0.29 | 0.03 | 0.26 | 0.00 | 0 | 1.30 | 4.482759 | A |
| Example 10 | 0.29 | 0.03 | 0.26 | 0.00 | 0 | 0.00 | 0.00000 | C |
| Comparative example 1 | 0.08 | 0.03 | 0.05 | 0.00 | 0 | 0.15 | 1.87500 | D |
| Comparative example 2 | 1.43 | 0.03 | 1.40 | 0.00 | 0 | 0.15 | 0.10490 | D |
| Comparative example 3 | 0.29 | 0.03 | 0.26 | 0.00 | 0 | 0.15 | 0.517241 | H |
| Comparative example 4 | 0.29 | 0.03 | 0.26 | 0.00 | 0 | 0.15 | 0.517241 | D |
| Comparative example 5 | 0.29 | 0.03 | 0.26 | 0.00 | 0 | 0.15 | 0.517241 | D |
| Comparative example 6 | 0.29 | 0.03 | 0.26 | 0.00 | 0 | 0.15 | 0.517241 | D |
| Comparative example 7 | 0.29 | 0.03 | 0.26 | 0.00 | 0 | 0.15 | 0.517241 | D |
| Example 11 | 0.29 | 0.03 | 0.26 | 0.00 | 0 | 0.15 | 0.517241 | B |
| Example 12 | 0.29 | 0.03 | 0.26 | 0.00 | 0 | 0.15 | 0.517241 | B |
| Example 13 | 0.26 | 0.00 | 0.26 | 0.00 | 0 | 0.15 | 0.576923 | B |
| Example 14 | 0.26 | 0.00 | 0.26 | 0.00 | 0 | 0.15 | 0.576923 | B |
| Example 15 | 0.35 | 0.09 | 0.26 | 0.00 | 0 | 0.15 | 0.428571 | C |
| Example 16 | 0.35 | 0.09 | 0.26 | 0.00 | 0 | 0.15 | 0.428571 | C |
| Example 17 | 0.13 | 0.03 | 0.00 | 0.10 | 0 | 0.15 | 1.153846 | C |
| Example 18 | 0.29 | 0.03 | 0.26 | 0.00 | 0 | 1.31 | 4.517241 | C |
| Example 19 | 0.29 | 0.03 | 0.26 | 0.00 | 0 | 0.04 | 0.137931 | C |
| Example 20 | 0.29 | 0.03 | 0.26 | 0.00 | 0 | 0.15 | 0.517241 | C |
| Example 21 | 0.29 | 0.03 | 0.26 | 0.00 | 0 | 0.15 | 0.517241 | C |
| Example 22 | 0.29 | 0.03 | 0.26 | 0.00 | 0 | 0.15 | 0.517241 | A |

From the above results, it can be seen that the electrostatic charge image developing toner according to the present example may prevent the image density unevenness when the images having a low image density are continuously formed under the high temperature and high humidity environment and then the secondary color images having a high image density are formed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing toner comprising:

a toner particle containing a binder resin, an alkali metal element and an alkaline earth metal element; and an external additive including a silica particle having a circularity of more than 0.5 and 0.9 or less and a volume average particle diameter of more than 100 nm and 300 nm or less, wherein a total Net intensity $N_A$ of the alkali metal element and the alkaline earth metal element in the toner particle measured by fluorescence X-ray analysis is 0.10 kcps or more and 1.20 kcps or less, and a ratio of a Net intensity of the alkaline earth metal element in the toner particle measured by fluorescence X-ray analysis to a Net intensity of the alkali metal element in the toner particle measured by fluorescence X-ray analysis is in a range of 3.3 to 40.

2. The electrostatic charge image developing toner according to claim 1, wherein the silica particle is an aggregate of silica primary particles having a volume average particle diameter of 10 nm or more and 90 nm or less.

3. The electrostatic charge image developing toner according to claim 2, wherein an aspect ratio of the aggregate is 1.4 or more and 5.5 or less.

4. The electrostatic charge image developing toner according to claim 1, wherein the alkali metal element and the alkaline earth metal element contain at least one selected from a group consisting of Na, Mg, and Ca.

5. The electrostatic charge image developing toner according to claim 2, wherein the alkali metal element and the alkaline earth metal element contain at least one selected from a group consisting of Na, Mg, and Ca.

6. The electrostatic charge image developing toner according to claim 3, wherein the alkali metal element and the alkaline earth metal element contain at least one selected from a group consisting of Na, Mg, and Ca.

7. The electrostatic charge image developing toner according to claim 1, wherein the alkali metal element and the alkaline earth metal element contain at least one selected from a group consisting of Na and Mg.

8. The electrostatic charge image developing toner according to claim 2, wherein the alkali metal element and the alkaline earth metal element contain at least one selected from a group consisting of Na and Mg.

9. The electrostatic charge image developing toner according to claim 3, wherein the alkali metal element and the alkaline earth metal element contain at least one selected from a group consisting of Na and Mg.

10. The electrostatic charge image developing toner according to claim 1, wherein a Net intensity $N_{Cl}$ of a Cl element measured by fluorescence X-ray analysis in the toner particle is 0.05 kcps or more and 1.30 kcps or less.

11. The electrostatic charge image developing toner according to claim 10, wherein a ratio $N_{Cl}/N_A$ of the Net intensity $N_{Cl}$ of the Cl element to the total Net intensity $N_A$ of the alkali metal element and the alkaline earth metal element is 0.05 or more and 6.5 or less.

12. The electrostatic charge image developing toner according to claim 1, wherein the binder resin contains an amorphous polyester resin and a crystalline polyester resin.

13. The electrostatic charge image developing toner according to claim 12, wherein the crystalline polyester resin is a polymer of an α, ω-linear aliphatic dicarboxylic acid and an α, ω-linear aliphatic diol.

14. An electrostatic charge image developer comprising the electrostatic charge image developing toner according to claim 1.

15. A toner cartridge that stores the electrostatic charge image developing toner according to claim 1 and is configured to be attached to and detached from an image forming apparatus.

16. A process cartridge configured to be attached to and detached from an image forming apparatus, the process cartridge comprising:

a developing unit that stores the electrostatic charge image developer according to claim 14 and is configured to develop an electrostatic charge image as a toner image by the electrostatic charge image developer, the electrostatic charge image being formed on a surface of an image carrier.

17. An image forming apparatus comprising:

an image carrier;

a charging unit configured to charge a surface of the image carrier;

an electrostatic charge image forming unit configured to form an electrostatic charge image on the surface of the image holder charged by the charging unit;

a developing unit that stores the electrostatic charge image developer according to claim 14 and is configured to develop the electrostatic charge image as a toner image by the electrostatic charge image developer, the electrostatic charge image being formed on the surface of the image carrier;

a transfer unit configured to transfer the toner image formed on the surface of the image carrier to a surface of a recording medium; and a fixing unit configured to fix the toner image transferred to the surface of the recording medium.

* * * * *